US011952935B2

(12) United States Patent
Klingbeil et al.

(10) Patent No.: US 11,952,935 B2
(45) Date of Patent: Apr. 9, 2024

(54) SYSTEMS AND METHOD FOR CONTROLLING AUTO-IGNITION

(71) Applicant: Transportation IP Holdings, LLC, Norwalk, CT (US)

(72) Inventors: Adam Edgar Klingbeil, Ballston Lake, NY (US); James Robert Mischler, Lawrence Park, PA (US); Daniel George Norton, Niskayuna, NY (US); Daniel Yerace, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 159 days.

(21) Appl. No.: 17/447,552

(22) Filed: Sep. 13, 2021

(65) Prior Publication Data

US 2021/0404372 A1    Dec. 30, 2021

Related U.S. Application Data

(60) Continuation-in-part of application No. 17/447,268, filed on Sep. 9, 2021, now Pat. No. 11,585,262, which
(Continued)

(51) Int. Cl.
*F02B 3/08*    (2006.01)
*F02D 19/06*    (2006.01)
(Continued)

(52) U.S. Cl.
CPC .............. *F02B 3/08* (2013.01); *F02D 19/061* (2013.01); *F02D 19/0692* (2013.01);
(Continued)

(58) Field of Classification Search
CPC ....... F02D 19/06; F02D 19/0639–0647; F02D 19/0692; F02D 19/081; F02D 19/082;
(Continued)

(56) References Cited

U.S. PATENT DOCUMENTS 2,767,691 A    10/1956    Mengelkamp et al.
4,433,667 A    2/1984    Ripper
(Continued)

FOREIGN PATENT DOCUMENTS

GB    2479567 A    10/2011
GB    2499284 A    * 8/2013    ........... F02D 19/061
(Continued)

OTHER PUBLICATIONS

Al-Sened, A. et al., "Knock Prediction in Industrial Dual Fuel Engines Using a Two-Zone Combustion Model With Consideration of Chemical Kinetics," Proceedings of the ASME Internal Combustion Division 2008 Spring Technical Conference, Apr. 27, 2008, Chicago, Illinois, 9 pages.
(Continued)

*Primary Examiner* — John M Zaleskas
(74) *Attorney, Agent, or Firm* — McCoy Russell LLP

(57) ABSTRACT

Methods and systems are provided for maintaining combustion stability in a multi-fuel engine. In one example, a system may include first and second fuel systems to deliver liquid and gaseous fuels, respectively, to at least one cylinder of the engine, and a controller. The controller may be configured to supply the gaseous fuel to the at least one cylinder, inject the liquid fuel to the at least one cylinder to compression ignite the liquid fuel and combust the gaseous fuel in the at least one cylinder, and retard an injection timing of the injection of the liquid fuel based on a measured parameter associated with auto-ignition of end gases subsequent to the compression-ignition of the liquid fuel. In some examples, the controller may further be configured to adjust an amount of the gaseous fuel relative to an amount of the liquid fuel based on the measured parameter.

19 Claims, 8 Drawing Sheets

Related U.S. Application Data is a continuation-in-part of application No. 15/889,662, filed on Feb. 6, 2018, now Pat. No. 11,143,090, which is a division of application No. 14/190,482, filed on Feb. 26, 2014, now Pat. No. 9,920,683, application No. 17/447,552, filed on Sep. 13, 2021 is a continuation-in-part of application No. 17/345,679, filed on Jun. 11, 2021, now Pat. No. 11,719,152, which is a continuation-in-part of application No. 15/899,068, filed on Feb. 19, 2018, now abandoned, and a continuation-in-part of application No. 15/889,662, filed on Feb. 6, 2018, now Pat. No. 11,143,090, and a continuation-in-part of application No. 16/942,516, filed on Jul. 29, 2020, now Pat. No. 11,473,515, which is a division of application No. 15/095,388, filed on Apr. 11, 2016, now abandoned, which is a continuation-in-part of application No. 14/251,726, filed on Apr. 14, 2014, now Pat. No. 9,309,819, which is a continuation-in-part of application No. PCT/US2012/064929, filed on Nov. 14, 2012, which is a continuation of application No. 13/328,438, filed on Dec. 16, 2011, now Pat. No. 8,682,512, said application No. 15/095,388 is a continuation-in-part of application No. 15/013,432, filed on Feb. 2, 2016, now abandoned, which is a continuation-in-part of application No. 13/484,621, filed on May 31, 2012, now Pat. No. 9,249,744, said application No. 16/942,516 is a continuation-in-part of application No. 15/013,432, filed on Feb. 2, 2016, now abandoned.

(51) Int. Cl.
| | |
|---|---|
| *F02D 19/08* | (2006.01) |
| *F02D 19/10* | (2006.01) |
| *F02D 29/02* | (2006.01) |
| *F02D 35/02* | (2006.01) |
| *F02D 41/00* | (2006.01) |
| *F02D 41/14* | (2006.01) |
| *F02D 41/40* | (2006.01) |
| *F02B 43/00* | (2006.01) |
| *F02D 41/30* | (2006.01) |
| *F02M 21/02* | (2006.01) |
| *F02M 26/05* | (2016.01) |
| *F02M 26/23* | (2016.01) |
| *F02M 26/43* | (2016.01) |
| *F02M 37/00* | (2006.01) |

(52) U.S. Cl.
CPC ......... *F02D 19/081* (2013.01); *F02D 19/082* (2013.01); *F02D 19/10* (2013.01); *F02D 19/105* (2013.01); *F02D 29/02* (2013.01); *F02D 35/027* (2013.01); *F02D 41/0025* (2013.01); *F02D 41/0027* (2013.01); *F02D 41/1497* (2013.01); *F02D 41/401* (2013.01); *F02B 43/00* (2013.01); *F02D 41/008* (2013.01); *F02D 41/3047* (2013.01); *F02M 21/0278* (2013.01); *F02M 26/05* (2016.02); *F02M 26/23* (2016.02); *F02M 26/43* (2016.02); *F02M 37/0064* (2013.01); *Y02T 10/30* (2013.01); *Y02T 10/40* (2013.01)

(58) Field of Classification Search
CPC .... F02D 19/10; F02D 35/027; F02D 41/0025; F02D 41/0027; F02D 41/401; F02D 41/1497; F02D 41/3094; Y02T 10/30; F02B 43/00; F02M 37/0064

See application file for complete search history.

(56) References Cited

U.S. PATENT DOCUMENTS

| | | | |
|---|---|---|---|
| 5,216,997 A | 6/1993 | Osanai et al. | |
| 6,000,384 A * | 12/1999 | Brown | F02D 41/2458 |
| | | | 123/436 |
| 6,044,824 A | 4/2000 | Mamiya et al. | |
| 6,155,101 A | 12/2000 | Renault et al. | |
| 6,158,418 A * | 12/2000 | Brown | F02D 41/0085 |
| | | | 123/435 |
| 6,302,091 B1 | 10/2001 | Iida | |
| 6,354,264 B1 * | 3/2002 | Iwakiri | F02D 41/1497 |
| | | | 123/436 |
| 6,606,979 B2 | 8/2003 | Kimura | |
| 7,255,080 B1 * | 8/2007 | Leone | F02P 15/001 |
| | | | 123/169 PB |
| 7,412,968 B2 | 8/2008 | Takayanagi et al. | |
| 7,546,834 B1 * | 6/2009 | Ulrey | F02D 19/0692 |
| | | | 123/576 |
| 7,798,128 B2 | 9/2010 | Bellistri et al. | |
| 8,516,991 B2 | 8/2013 | Tanno et al. | |
| 8,583,348 B2 | 11/2013 | Iwazaki et al. | |
| 9,371,789 B2 | 6/2016 | Rosswurm et al. | |
| 9,903,284 B1 * | 2/2018 | Lavertu | F02D 41/38 |
| 2002/0078918 A1 * | 6/2002 | Ancimer | F02B 7/08 |
| | | | 123/304 |
| 2003/0221661 A1 * | 12/2003 | Willi | F02D 41/403 |
| | | | 123/304 |
| 2004/0118557 A1 * | 6/2004 | Ancimer | F02B 23/0672 |
| | | | 166/227 |
| 2004/0231650 A1 | 11/2004 | Gray, Jr. | |
| 2005/0109316 A1 * | 5/2005 | Oda | F02D 19/0692 |
| | | | 123/406.29 |
| 2005/0155344 A1 * | 7/2005 | Kobayashi | F02D 41/3058 |
| | | | 123/304 |
| 2005/0161017 A1 * | 7/2005 | Warlick | F02D 19/10 |
| | | | 123/275 |
| 2007/0039588 A1 * | 2/2007 | Kobayashi | F02D 19/0689 |
| | | | 123/304 |
| 2007/0044753 A1 * | 3/2007 | Brehob | F02M 43/04 |
| | | | 123/304 |
| 2007/0119391 A1 * | 5/2007 | Fried | F02D 19/081 |
| | | | 123/25 A |
| 2007/0125321 A1 * | 6/2007 | Ritter | F02D 19/023 |
| | | | 123/526 |
| 2007/0157912 A1 * | 7/2007 | Ritter | F02D 19/0631 |
| | | | 123/526 |
| 2007/0215071 A1 * | 9/2007 | Dearth | F02D 41/0025 |
| | | | 123/3 |
| 2008/0230041 A1 | 9/2008 | Brusslar et al. | |
| 2009/0095546 A1 * | 4/2009 | Zubeck | F02D 41/0027 |
| | | | 180/54.1 |
| 2009/0101111 A1 * | 4/2009 | Brehob | F02M 43/04 |
| | | | 701/111 |
| 2009/0159057 A1 * | 6/2009 | Pursifull | F02D 19/0692 |
| | | | 123/456 |
| 2009/0308367 A1 * | 12/2009 | Glugla | F02D 19/061 |
| | | | 123/299 |
| 2011/0011382 A1 | 1/2011 | Lippa et al. | |
| 2011/0017174 A1 * | 1/2011 | Ulrey | F02D 19/0694 |
| | | | 123/456 |
| 2011/0088657 A1 * | 4/2011 | Tanno | F02D 19/061 |
| | | | 123/305 |
| 2011/0224886 A1 | 9/2011 | Wang et al. | |
| 2011/0247325 A1 | 10/2011 | Lippa et al. | |
| 2011/0247586 A1 * | 10/2011 | Zubeck | F02D 41/3035 |
| | | | 123/299 |
| 2011/0259290 A1 * | 10/2011 | Michikawauchi | F02D 19/0692 |
| | | | 123/1 A |
| 2011/0313641 A1 * | 12/2011 | Glugla | F02M 69/46 |
| | | | 701/104 |
| 2012/0041665 A1 * | 2/2012 | Pursifull | F02D 19/0692 |
| | | | 701/103 |
| 2012/0245827 A1 * | 9/2012 | Glugla | F02D 41/3094 |
| | | | 701/105 |

(56) References Cited

U.S. PATENT DOCUMENTS

| | | | | |
|---|---|---|---|---|
| 2012/0298072 | A1* | 11/2012 | Zubeck | F02D 41/3035 123/304 |
| 2013/0073183 | A1* | 3/2013 | Cohn | F02D 41/005 701/104 |
| 2013/0255628 | A1* | 10/2013 | Moren | F02B 69/04 123/406.29 |
| 2013/0311066 | A1* | 11/2013 | Guimaraes | F02D 41/3094 701/104 |
| 2013/0325295 | A1* | 12/2013 | Klingbeil | F02D 41/0025 701/104 |
| 2014/0000557 | A1* | 1/2014 | Glugla | F02D 41/008 123/434 |
| 2014/0238340 | A1* | 8/2014 | Dunn | F02D 19/0642 123/299 |
| 2014/0331642 | A1* | 11/2014 | Dearth | F02D 19/0647 60/273 |
| 2014/0331970 | A1* | 11/2014 | Bidner | F02D 19/10 123/435 |
| 2014/0373822 | A1* | 12/2014 | Rosswurm | F02D 41/0025 123/676 |
| 2015/0059686 | A1* | 3/2015 | Glugla | F02D 41/402 123/445 |
| 2015/0101566 | A1* | 4/2015 | Leone | F02D 19/081 123/304 |
| 2015/0176509 | A1* | 6/2015 | Lavertu | F02D 41/0027 123/27 GE |
| 2015/0219027 | A1* | 8/2015 | zur Loye | F02B 37/183 60/323 |
| 2015/0240738 | A1* | 8/2015 | Yerace | F02D 29/02 123/27 GE |
| 2015/0308366 | A1* | 10/2015 | Melnyk | F02D 41/0025 123/480 |
| 2015/0322896 | A1* | 11/2015 | Arnold | F02D 41/1439 123/445 |
| 2016/0032847 | A1* | 2/2016 | Suzuki | F02D 41/22 123/435 |
| 2016/0069252 | A1* | 3/2016 | Lavertu | F02D 19/0647 123/435 |
| 2016/0069291 | A1 | 3/2016 | Ge et al. | |
| 2016/0115882 | A1* | 4/2016 | Imhof | F02D 35/027 123/525 |
| 2016/0153375 | A1* | 6/2016 | Klingbeil | F02D 41/0027 123/577 |
| 2016/0281615 | A1* | 9/2016 | Flynn | F02D 41/0025 |
| 2016/0290250 | A1* | 10/2016 | Kurotani | F02D 19/0626 |
| 2017/0009671 | A1* | 1/2017 | zur Loye | F02M 26/24 |
| 2017/0089278 | A1* | 3/2017 | Tulapurkar | F02D 35/027 |
| 2017/0122246 | A1* | 5/2017 | Ottikkutti | F02D 41/401 |
| 2017/0234245 | A1* | 8/2017 | Bruner | F02D 19/0647 123/525 |
| 2018/0238225 | A1* | 8/2018 | Yerace | F02D 19/061 |
| 2019/0093572 | A1* | 3/2019 | Kim | F02D 41/266 |
| 2019/0257253 | A1* | 8/2019 | Klingbeil | F02D 19/0642 |
| 2021/0301714 | A1* | 9/2021 | Klingbeil | F02M 37/0064 |
| 2021/0404371 | A1* | 12/2021 | Yerace | F02D 41/1497 |
| 2022/0034284 | A1* | 2/2022 | Klingbeil | F02D 19/0644 |

FOREIGN PATENT DOCUMENTS

| | | | | |
|---|---|---|---|---|
| JP | 09112325 | A * | 4/1997 | F02B 23/0663 |
| JP | H10252529 | A | 9/1998 | |
| JP | H10252571 | A | 9/1998 | |
| JP | 2006316667 | A | 11/2006 | |
| JP | 2010216395 | A * | 9/2010 | F02D 19/061 |
| KR | 101325501 | B1 | 11/2013 | |
| WO | 9527128 | A1 | 10/1995 | |
| WO | WO-2011128692 | A1 * | 10/2011 | F02D 19/0647 |
| WO | WO-2013117942 | A2 * | 8/2013 | F02D 19/061 |

OTHER PUBLICATIONS

El-Kasaby, M. et al., "Experimental investigation of ignition delay period and performance of a diesel engine operated with Jatropha oil biodiesel," Alexandria Engineering Journal, vol. 52, No. 2, Jun. 2013, 10 pages.

Hairuddin, A. et al., "A review of hydrogen and natural gas addition in diesel HCCI engines," Renewable and Sustainable Energy Reviews, vol. 32, Apr. 2014, 23 pages.

Gaba, V. et al., "Thermodynamic Analysis of Diesel Engine Using Producer Gas as Secondary Fuel," Proceedings of the 10th International Conference on Heat Transfer, Fluid Mechanics and Thermodynamics, Jul. 14, 2014, Orlando, Florida, 6 pages.

"5 Things You Didn't Know About Bi-Fuel And Dual-Fuel," Worldwide Power Website, Available Online at https://www.wpowerproducts.com/news/5-things-you-didnt-know-about-bi-fuel-and-dual-fuel/, Available as Early as Jan. 2017, 6 pages.

\* cited by examiner

SYSTEMS AND METHOD FOR CONTROLLING AUTO-IGNITION

CROSS REFERENCE TO RELATED APPLICATIONS

The present application is a continuation-in-part of U.S. Non-Provisional patent application Ser. No. 17/447,268 entitled "SYSTEM AND METHOD FOR CONTROLLING AUTO-IGNITION" and filed on Sep. 9, 2021. U.S. Non-Provisional patent application Ser. No. 17/447,268 is a continuation-in-part of U.S. Non-Provisional patent application Ser. No. 15/899,662 entitled "SYSTEMS AND METHOD FOR CONTROLLING AUTO-IGNITION" and filed on Feb. 6, 2018. U.S. Non-Provisional patent application Ser. No. 15/899,662 is a divisional of U.S. Non-Provisional patent application Ser. No. 14/190,482 entitled "SYSTEMS AND METHOD FOR CONTROLLING AUTO-IGNITION" and filed on Feb. 26, 2014, which issued as U.S. Pat. No. 9,920,683 on Mar. 20, 2018. The present application is also a continuation-in-part of U.S. Non-Provisional patent application Ser. No. 17/345,679 entitled "MULTIVARIABLE DYNAMIC CONTROL SYSTEM OF A MULTI-FUEL ENGINE" and filed on Jun. 11, 2021. U.S. Non-Provisional patent application Ser. No. 17/345,679 is a continuation-in-part of U.S. Non-Provisional patent application Ser. No. 15/899,068, entitled "MULTIVARIABLE DYNAMIC CONTROL SYSTEM OF A MULTI-FUEL ENGINE," and filed on Feb. 19, 2018. U.S. Non-Provisional patent application Ser. No. 17/345,679 is also a continuation-in-part of U.S. Non-Provisional patent application Ser. No. 15/889,662, entitled "SYSTEMS AND METHOD FOR CONTROLLING AUTO-IGNITION," and filed on Feb. 6, 2018. U.S. Non-Provisional patent application Ser. No. 15/889,662 is a divisional of U.S. Non-Provisional patent application Ser. No. 14/190,482, entitled "SYSTEMS AND METHOD FOR CONTROLLING AUTO-IGNITION," and filed on Feb. 26, 2014, which issued as U.S. Pat. No. 9,920,683 on Mar. 20, 2018. U.S. patent application Ser. No. 17/345,679 is also a continuation-in-part of U.S. Non-Provisional patent application Ser. No. 16/942,516, entitled "MULTI-FUEL SYSTEM AND METHOD," and filed on Jul. 29, 2020. U.S. Non-Provisional patent application Ser. No. 16/942,516 is a divisional of U.S. application Ser. No. 15/095,388, entitled "MULTI-FUEL SYSTEM AND METHOD," and filed on Apr. 11, 2016. U.S. Non-Provisional patent application Ser. No. 15/095,388 is a continuation-in-part of U.S. Non-Provisional patent application Ser. No. 14/251,726, entitled "MULTI-FUEL SYSTEM AND METHOD," and filed on Apr. 14, 2014, which issued as U.S. Pat. No. 9,309,819 on Apr. 12, 2016. U.S. Non-Provisional patent application Ser. No. 14/251,726 is a continuation-in-part of International Application No. PCT/US2012/064929, entitled "FUEL OPTIMIZING SYSTEMS FOR A MOBILE ASSET, AND A RELATED METHOD THEREOF," and filed on Nov. 14, 2012. International Application No. PCT/US2012/064929 is a continuation of U.S. Non-Provisional patent application Ser. No. 13/328,438, entitled "FUEL OPTIMIZING SYSTEMS FOR A MOBILE ASSET, AND A RELATED METHOD THEREOF," and filed on Dec. 16, 2011, which has been issued as U.S. Pat. No. 8,682,512 on Mar. 3, 2014. U.S. Non-Provisional patent application Ser. No. 15/095,388 is also a continuation-in-part of U.S. Non-Provisional patent application Ser. No. 15/013,432, entitled "METHOD FOR OPERATING AN ENGINE," and filed on Feb. 2, 2016. U.S. Non-Provisional patent application Ser. No. 15/013,432 is a continuation-in-part of U.S. Non-Provisional patent application Ser. No. 13/484,621, entitled "METHOD FOR OPERATING AN ENGINE," and filed on May 31, 2012, which issued as U.S. Pat. No. 9,249,744 on Feb. 16, 2016. U.S. Non-Provisional patent application Ser. No. 16/942,516 is also a continuation-in-part of U.S. Non-Provisional patent application Ser. No. 15/013,432, entitled "METHOD FOR OPERATING AN ENGINE," and filed on Feb. 2, 2016. U.S. Non-Provisional patent application Ser. No. 15/013,432 is a continuation-in-part of U.S. Non-Provisional patent application Ser. No. 13/484,621, entitled "METHOD FOR OPERATING AN ENGINE," and filed on May 31, 2012, which issued as U.S. Pat. No. 9,249,744 on Feb. 16, 2016. The entire contents of the above-referenced applications are hereby incorporated by reference for all purposes.

FIELD

Embodiments of the subject matter disclosed herein relate to an engine, engine components, and an engine system, for example.

BACKGROUND

Engines may be configured to operate with more than one fuel type. For example, engines may operate with liquid fuel, such as diesel, and gaseous fuel, such as natural gas. A mixture of gaseous fuel and air provided to a cylinder of an engine may be ignited when liquid fuel is injected into the cylinder. The compression of the cylinder ignites the liquid fuel and the gas/air mixture burns from the initiation site created by the liquid fuel combustion, forming a flame front that propagates to heat the unburned mixture ahead of the flame front. Under certain conditions where the temperature and pressure of the unburned gases reach an auto-ignition limit, combustion may be initiated before the flame front can initiate combustion, resulting in a secondary ignition point or volumetric ignition of the remaining mixture. If the secondary ignition point is formed or volumetric ignition occurs, detonation waves may be formed that can lead to engine degradation. Further, uncontrolled auto-ignition may result in high in-cylinder pressure, which may lead to engine degradation and potentially higher emissions due to higher in-cylinder temperatures.

BRIEF DESCRIPTION

In one embodiment, a system may a fuel system configured to supply one or more of a first fuel, a second fuel, and a pre-mixture thereof to at least one cylinder of an engine. The system may further include a controller including instructions stored in non-transitory memory thereof that cause the controller to adjust a timing of an injection of the first fuel and maintaining a substitution rate in response to an auto-ignition level being less than or equal to a threshold level. In this way, upon indication that auto-ignition of end gases subsequent to the compression-ignition of the liquid fuel is occurring, the amount of second fuel relative to the amount of first fuel may be decreased to reduce the auto-ignition. In some examples, the injection timing of the liquid fuel injection may be adjusted (e.g., retarded) prior to adjusting the amount of gaseous fuel relative to the amount of liquid fuel following the indication of auto-ignition.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
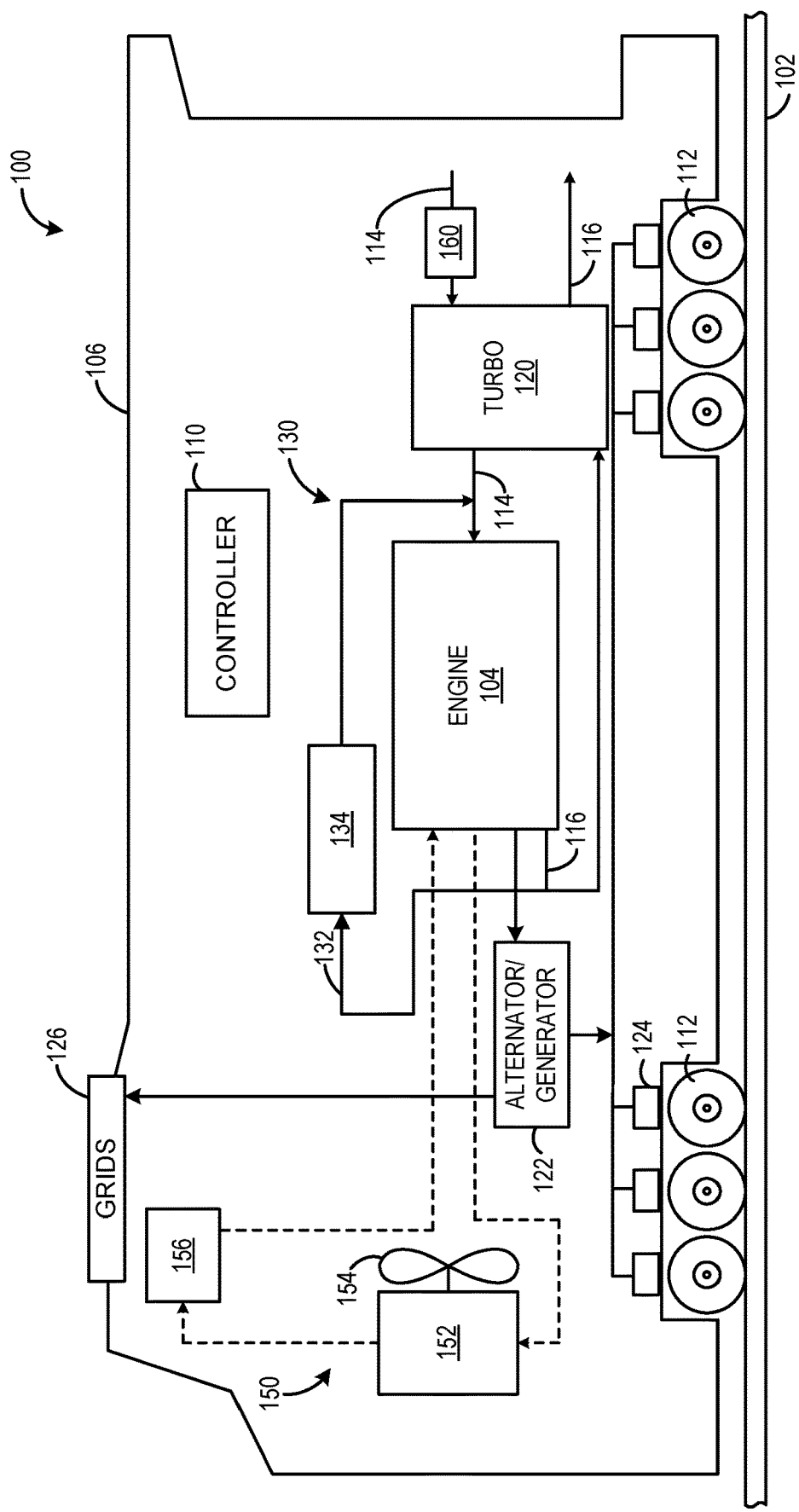
FIG. 1 shows a schematic diagram of a rail vehicle with an engine according to an embodiment of the invention.

One or more embodiments of the inventive subject matter described herein provide systems and methods that predict susceptibility of a multi-fuel engine to knock, and/or to implement one or more responsive actions that change operation of the engine to prevent knock or to reduce the likelihood of knock. The multi-fuel engine concurrently or simultaneously consumes two or more combustion fuels to convert energy stored in the fuels to another form of energy, such as rotation of a shaft. In one embodiment, the engine operates to propel a vehicle, but optionally can operate to perform other work, such as to generate electric current for powering a stationary load. The multi-fuel engine may differ from a strictly bi-fuel engine in that a bi-fuel engine can consume different fuels at different times (e.g., by switching between which fuel is consumed at different times), whereas the multi-fuel engine consumes two or more different combustion fuels at the same time. Alternatively, the engine may be a bi-fuel engine in another embodiment.

Auto-ignition of the end gases following ignition of the injected fuel may be a function of many different parameters, such as ignition (e.g., injection) timing, air temperature in the cylinder, and in-cylinder combustion mixture. Thus, to reduce auto-ignition, multiple factors may be adjusted, such as ignition timing. With respect to dual fuel engines which use diesel injection to ignite a premixed air/natural gas mixture, the substitution ratio is another factor which may affect auto-ignition. As the substitution ratio increases (where more energy is derived from pre-mixed natural gas compared to the non-premixed diesel), the likelihood of auto-ignition combustion increases. According to embodiments disclosed herein, the substitution ratio is used as another lever to adjust to control auto-ignition. If auto-ignition is detected and other methods such as retarding diesel injection timing do not reduce the auto-ignition to acceptable levels, the substitution ratio may be decreased (e.g., gaseous fuel amount reduced and/or liquid fuel amount increased) until auto-ignition is eliminated. FIGS. 1-3 and 7-8 illustrate an engine configured to operate with multiple fuels, such as a liquid fuel and a gaseous fuel. Suitable liquid fuels may include one or more of diesel, gasoline, kerosene, ethanol, methanol, dimethyl ether (DME), or another liquid fuel type. Suitable gaseous fuels may include one or more of compressed natural gas, liquefied natural gas, ammonia, syngas, hydrogen, ethanol, methanol, DME, or another gaseous fuel type. The engine of FIGS. 1-3 and 7-8 may be controlled by a controller according to methods and routines illustrated in FIGS. 4-6 and 9.

The engine may operate via a combination of different fuels. These fuels may have relatively different amounts of carbon. In one example, the engine may be a multi-fuel engine configured to combust a plurality of fuels. The engine may combust one or more of gasoline, diesel, hydrogenation-derived renewable diesel (HDRD), alcohol, ammonia, biodiesels, hydrogen, natural gas, kerosene, syn-gas, and the like. The plurality of fuels may include gaseous fuels and liquid fuels, alone or in combination. A substitution rate of a primary fuel of the engine with a secondary fuel may be determined based on a current engine load. In one embodiment, the substitution rate may correspond to an injection amount of a fuel with a relatively lower carbon content or zero carbon content (e.g., hydrogen gas). As the substitution rate increases, the relative proportion of fuel with the lower or zero carbon content increases and the overall amount of carbon content in the combined fuel lowers.

In one example, the engine may combust fuels that include both diesel and ammonia. During some operating modes, the engine may combust only diesel, only ammonia, or a combination thereof (e.g., during first, second, and third conditions, respectively).

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

The multi-fuel engine may consume combustion fuels to convert the energy stored in those fuels to another form of energy. While one or more stabilizing fuels may or may not be provided to the engine (in addition to combustion fuels), the term "combustion fuel" as used herein excludes and does not include a stabilizing fuel in one embodiment. A stabilizing fuel (also referred to as a fuel stabilizer) can be added to a combustion fuel or mixture of combustion fuels to change the flame speed (or rate of expansion of a flame front in a combustion reaction) of combustion fuel(s). A stabilizing fuel also can be added to combustion fuel(s) to provide a protective layer for the combustion fuel(s) in a tank or other container. Stabilizing fuels can be pure hydrogen, pure methane, or a combination thereof, or can be a combination of antioxidants and lubricants. While the combustion fuel or fuels are converted into another form of energy by the engine, a stabilizing fuel may not be converted into another form of energy. For example, the engine may not consume the stabilizing fuel to rotate a shaft, propel a vehicle, or perform other work, such as to generate electric current.

The inventive subject matter described herein can reduce the chance of engine knock by controlling the substitution ratio. The substitution ratio is the amount of premixed combustion fuel relative to total combustion fuel supplied to the cylinders of the engine. The systems and methods described herein may, for example, increase or maximize the substitution rate while controlling the system to maintain knock-free operation, while also ensuring that the non-premixed combustion fuel is not eliminated. The systems and methods can calculate and/or estimate an autoignition delay based at least in part on one or more measured operating parameters of the engine (including the fuel rates). The amount of delay may correlate to a likelihood of engine knock. Optionally, the calculated delay can be compared with a measured knock index value to determine the likelihood of engine knock (with delays that are longer correlating to a smaller index value and being less likely to result in engine knock than delays that are shorter with a high index value). The measured knock index value can be determined from a variety of sensors including vibration sensors, knock sensors, pressure sensors, or the like. This information can then be used to guide adjustments to a powered system that includes the engine. For example, during transient events of the powered system, smaller step modifications to the substitution rate may be made (relative to times outside of the transient events) if the autoignition delay is relatively short (e.g., when the system is approaching a knocking condition).

In one embodiment, the systems and methods can calculate a maximum or other upper limit on the substitution rate based on the operating parameters of the engine and a desired minimum (or other limit) autoignition delay. This may be used to increase or maximize the substitution rate because the calculated maximum or upper limit represents the upper level that the powered system can maintain to ensure that the substitution rate is maximized or increased while avoiding a knocking condition that can be detrimental to the mechanical health of the engine. The upper limit or maximum can be the largest or greatest value that the substitution rate can be or have. While the substitution rate can change over time or be different at different times, the substitution rate does not exceed the upper limit. The substitution rate may, at times, be less than the upper limit or maximum and, at other times, be equal to the upper limit or maximum, but is not greater than the upper limit or maximum in one embodiment.

The autoignition delays described herein can be experimentally measured and/or modeled based on thermodynamics of the engine and chemistry of the combustion fuel(s). For example, the systems and methods described herein examine several variables that can be modeled, measured or estimated within an engine control unit to calculate whether a condition in which the multi-fuel engine is operating is likely to result in engine knock. These calculations are based on the physics of thermodynamics and combustion in the multi-fuel engine, and therefore can be tuned using a relatively small number of experiments and then be extrapolated to conditions that are not or cannot be easily tested with an engine, and may only be seen in transient operation of the engine. The probability of knock that is acceptable can be static and pre-set, or optionally can be dynamic based on, for example, determined operating parameter settings or manual input from an operator. In one embodiment, the system may switch between two or more operating modes where the operation of the engine is switched to and from a lower probability of knock and a higher probability of knock to affect the output of the engine's power, performance, emissions level and the like.

At least one technical effect of an embodiment of the inventive subject matter described herein is to reduce how often knock occurs in a multi-fuel engine and/or to eliminate knock in the multi-fuel engine based on measured operating conditions of the engine. The systems and methods can calculate knocking conditions based on a number of operating conditions (also referred to herein as engine parameters). From these inputs, an ignition or autoignition delay is calculated for a premixed combustion fuel-air mixture, which can then be used to infer whether the mixture is likely to auto-ignite (e.g., knock). This delay represents a time delay between introducing the premixed combustion fuel into a cylinder and the time at which the mixture will autoignite in the cylinder. The premixed combustion fuel substitution rate can be adjusted based at least in part on this calculated ignition delay or a "likelihood parameter." The premixed combustion fuel substitution rate is the amount or rate at which premixed combustion fuel is supplied to the multi-fuel engine in place of non-premixed combustion fuel. For example, the multi-fuel engine (or one or more, or all, cylinders of the engine) may receive a total amount or rate of combustion fuels T that can be expressed as:

$$T=G+L$$

where G represents the amount or rate at which premixed combustion fuel is supplied to one or more (or all) cylinders of the multi-fuel engine and L represents the amount or rate at which non-premixed combustion fuel is supplied to one or more (or all) cylinders of the engine. The total amount or rate of combustion fuels T supplied to the engine and/or cylinder(s) may not change. Therefore, if the premixed combustion fuel substitution rate is adjusted to decrease the amount or rate of premixed combustion fuel supplied to the engine and/or cylinder(s) by an amount $\Delta G$, then the amount or rate of non-premixed combustion fuel supplied to the engine and/or cylinder(s) can increase by an amount $\Delta L$:

$$T=G+L=(G-\Delta G)+(L+\Delta L)$$

Conversely, if the premixed combustion fuel substitution rate dictates increasing the amount or rate of premixed combustion fuel into the engine and/or cylinder(s) by an amount $\Delta G$, then the amount or rate of non-premixed combustion fuel supplied to the engine and/or cylinder(s) can decrease by an amount $\Delta L$:

$$T=G+L=(G+\Delta G)+(L-\Delta L)$$

The systems and methods can, in one embodiment, model the thermochemistry of the multi-fuel engine to predict the conditions inside one or more (or all) cylinders of the engine during operation of the engine over a wide range of possible operating conditions. In one embodiment, an engine may have donor and non-donor cylinders for an exhaust gas recirculation (EGR) system, and as such the controller may treat the various sub-groups of cylinders differently from each other. The systems and methods can predict auto-ignition behavior of the engine for peak cylinder pressure conditions where unburned premixed combustion fuel and air mixtures are most likely to (or have a determined level of probability to) autoignite or detonate instead of burning or being combusted. Autoignition is ignition of the premixed combustion fuel and air mixture without an external source of ignition, such as a spark from a spark plug or flame propagation within the premixed fuel-air mixture. Burning or combustion of a combustion fuel (gas and/or liquid) and air mixture is an exothermic redox chemical reaction between the combustion fuel (gas and/or liquid) and an oxidant (air) brought about by the external source of ignition.

A transfer function can be used by the systems and methods to map the premixed combustion fuel substitution rate for the supply of combustion fuels to the engine as a function of the operating conditions and/or autoignition delay. These operating conditions can include manifold airflow temperature of the engine, manifold airflow pressure of the engine, air flow (rate and/or amount) into or out of the engine, the rate at which non-premixed combustion fuel is supplied to the engine or one or more cylinders of the engine, the speed at which the engine is operating, the timing of combustion fuel injection into the cylinder(s) of the engine, the autoignition delay minimum allowable threshold, a ratio of air-to-fuel (AFR) injected into one or more cylinders of the engine (e.g., the ratio of air to the premixed combustion fuel and/or the non-premixed combustion fuel), the temperature of the exhaust out of the engine or out of one or more cylinders of the engine, a speed at which a turbocharger coupled with the engine operates, a ratio of oxygen to fuel (OFR) in the cylinder(s) of the engine (e.g., a ratio of the amount of oxygen to the amount of premixed combustion fuel and/or non-premixed combustion fuel), a combustion fuel substitution ratio (e.g., a ratio indicative of how much non-premixed combustion fuel to the engine has been replaced by supply of the premixed combustion fuel to the engine), and/or a cylinder pressure (e.g., the largest or peak pressure inside one or more of the cylinders of the engine during a combustion cycle).

The transfer function can be used by the systems and methods to calculate an upper limit on the quantity of premixed combustion fuel that can be injected into the cylinders of the engine for a given operating condition (or combination of conditions) and autoignition delay (e.g., a designated likelihood of engine knock). In one example, the premixed combustion fuel substitution rate (e.g., the ratio of premixed combustion fuel to total combustion fuel supplied to the engine or engine cylinder) decreases for hotter manifold airflow temperatures, greater manifold airflow pressures, decreased air flows into or out of the engine, increases in the rate at which non-premixed combustion fuel is supplied to the engine or one or more cylinders of the engine, slower engine speeds, earlier combustion fuel injection timings, shorter autoignition delays, smaller air-to-fuel ratios, hotter exhaust temperatures, faster turbocharger speeds, smaller oxygen-to-fuel ratios, and/or greater cylinder pressures. For example, less premixed combustion fuel and more non-premixed combustion fuel may be supplied to the engine and/or cylinder(s) for hotter manifold airflow temperatures, greater manifold airflow pressures, decreased air flows into or out of the engine, increases in the rate at which non-premixed combustion fuel is supplied to the engine or one or more cylinders of the engine, slower engine speeds, earlier combustion fuel injection timings, shorter autoignition delays, smaller air-to-fuel ratios, hotter exhaust temperatures, faster turbocharger speeds, smaller oxygen-to-fuel ratios, and/or greater cylinder pressures.

Conversely, more premixed combustion fuel and less non-premixed combustion fuel may be supplied to the engine and/or cylinder(s) for cooler manifold airflow temperatures, reduced manifold airflow pressures, increased air flows into or out of the engine, decreases in the rate at which non-premixed combustion fuel is supplied to the engine or one or more cylinders of the engine, faster engine speeds, later fuel injection timings, longer autoignition delays, greater air-to-fuel ratios, cooler exhaust temperatures, slower turbocharger speeds, greater oxygen-to-fuel ratios, and/or smaller cylinder pressures. In one embodiment, the systems and methods can reduce, but not eliminate the supply of non-premixed combustion fuel to the engine and/or cylinders. That is, regardless of the increase in the premixed combustion fuel substitution rate (e.g., regardless of how much the amount or rate of premixed combustion fuel supply is increased), there is at least some non-premixed fuel injected into the engine and/or cylinder(s) during all combusting conditions.

In one embodiment, the systems and methods can calculate the ignition delay as a function of operating condition (or combination of operating conditions) and premixed combustion fuel being supplied to the engine and/or cylinder(s). This can be calculated as a real-time estimate of knock likelihood, even during transient events (e.g., increasing power from low to high while operating in a multi-fuel mode of the engine). This knock likelihood estimate can be presented to an operator of the vehicle and/or to an engine control unit of the vehicle, so that the operator can manually implement and/or the engine control unit can automatically implement one or more responsive actions. The responsive action(s) can include changes in control of the vehicle that reduce the likelihood of knock, such as derating the engine of the vehicle, adjusting the timing of the fuel injection or combustion event, reducing the substitution rate, reducing a throttle setting, turning the engine off, increasing a rate of circulation of an engine coolant, injecting a coolant (e.g., water) into the cylinder(s) of the engine, changing a flow rate of coolant through an EGR cooler, changing an operation of one or more turbochargers, and the like.

Before further discussion of the approach for reducing auto-ignition of end gases in a dual fuel engine, an example of a platform is disclosed in which an engine may be configured for a vehicle, such as a rail vehicle. For example, FIG. 1 shows a block diagram of an example embodiment of a vehicle system 100, herein depicted as a rail vehicle 106 (e.g., locomotive), configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above. Other examples of vehicles in which the engine may be arranged include on-road transportation vehicles (e.g., automobiles), mining equipment, marine vessels, aircrafts, rail vehicles, and other off-highway vehicles (OHVs).

The engine 104 receives intake air for combustion from an intake passage 114. The intake passage 114 receives ambient air from an air filter 160 that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In another example, engine 104 is a dual or multi-fuel engine that may combust a mixture of gaseous fuel and air upon injection and compression ignition of diesel fuel. In other non-limiting embodiments, the engine 104 may additionally combust fuel including gasoline, hydrogen, ammonia, alcohol such as ethanol (EtOH) and/or methanol, kerosene, natural gas, biodiesel, hydrogenation-derived renewable diesel (HDRD), syn-gas, or other petroleum distillates of similar density through compression ignition (and/or spark ignition). The engine 104 may be configured to combust fuel in gaseous and/or liquid states.

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel and/or natural gas engine that generates a torque output that is transmitted to the alternator/generator 122 which is mechanically coupled to the engine 104. In one embodiment herein, engine 104 is a multi-fuel engine operating with diesel fuel and natural gas, but in other examples engine 104 may use various combinations of fuels other than diesel and natural gas. In one example, diesel may be replaced by or supplemented with a liquid fuel including biodiesel, ethanol, methanol, or DME. In an additional or alternative example, natural gas may be replaced by or supplemented with a gaseous fuel including hydrogen, ammonia, syngas, ethanol, methanol, or DME. Regarding ethanol, methanol, and DME, such fuels may be stored as compressed liquids or may be liquids at room temperature (e.g., 20° C.), and may serve as liquid ignition sources (e.g., supplied via a liquid fuel system) in some examples. However, ethanol, methanol, or DME may be vaporized to the gaseous form upon injection into an intake manifold of the engine 104 (e.g., via a gaseous fuel system separate from the liquid fuel system). Thus, for example, ethanol, methanol, or DME may be port injected with diesel fuel serving as the liquid ignition source in a multi-fuel configuration.

The alternator/generator 122 produces electrical power that may be stored and applied for subsequent propagation to a variety of downstream electrical components. As an example, the alternator/generator 122 may be electrically coupled to a plurality of traction motors 124 and the alternator/generator 122 may provide electrical power to the plurality of traction motors 124. As depicted, the plurality of traction motors 124 are each connected to one of a plurality of wheels 112 to provide tractive power to propel the rail vehicle 106. One example configuration includes one traction motor per wheel set. As depicted herein, six pairs of traction motors correspond to each of six pairs of motive wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

In some embodiments, the vehicle system 100 may include a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages. Additionally or alternatively, in some embodiments, a supercharger may be present to compress the intake air via a compressor driven by a motor or the engine, for example. Further, in some embodiments, a charge air cooler may be present between the compressor of the turbocharger or supercharger and the intake manifold of the engine. The charge air cooler may cool the compressed air to further increase the density of the charge air.

In some embodiments, the vehicle system 100 may further include an aftertreatment system coupled in the exhaust passage upstream and/or downstream of the turbocharger 120. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system 100 may further include an exhaust gas recirculation (EGR) system 130 coupled to the engine 104, which routes exhaust gas from an exhaust passage 116 of the engine 104 to the intake passage 114 downstream of the turbocharger 120. In some embodiments, the EGR system 130 may be coupled exclusively to a group of one or more donor cylinders of the engine (also referred to a donor cylinder system). As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_x$).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 110, or it may control a variable amount of EGR, for example. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the rail vehicle 106 is moving slowly or stopped while the engine is running. In some examples, fan speed may be controlled by a controller, such as controller 110. Coolant which is cooled by the radiator 152 enters a tank 156. The coolant may then be pumped by a water, or coolant, pump (not shown) back to the engine 104 or to another component of the vehicle system, such as the EGR cooler and/or charge air cooler.

The rail vehicle 106 further includes an engine controller 110 (referred to hereafter as the controller) to control various components related to the rail vehicle 106. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of rail vehicle operation. In some examples, controller 110 may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine 104 and/or rail vehicle 106, may be configured to receive signals from a variety of engine sensors, as further elaborated herein, in order to determine operating parameters and operating conditions, and correspondingly adjust various engine actuators to control operation of the engine 104 and/or rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperature in the EGR cooler, or the like. Correspondingly, the controller 110 may control engine 104 and/or the rail vehicle 106 by sending commands to various components such as the traction motors 124, the alternator/generator 122, fuel injectors, or the like. For example, the controller 110 may control the timing and/or duration of liquid fuel injection, and/or the timing and/or duration of gaseous fuel supply, as described below. Other actuators may be coupled to various locations in the rail vehicle.

Figure 2:
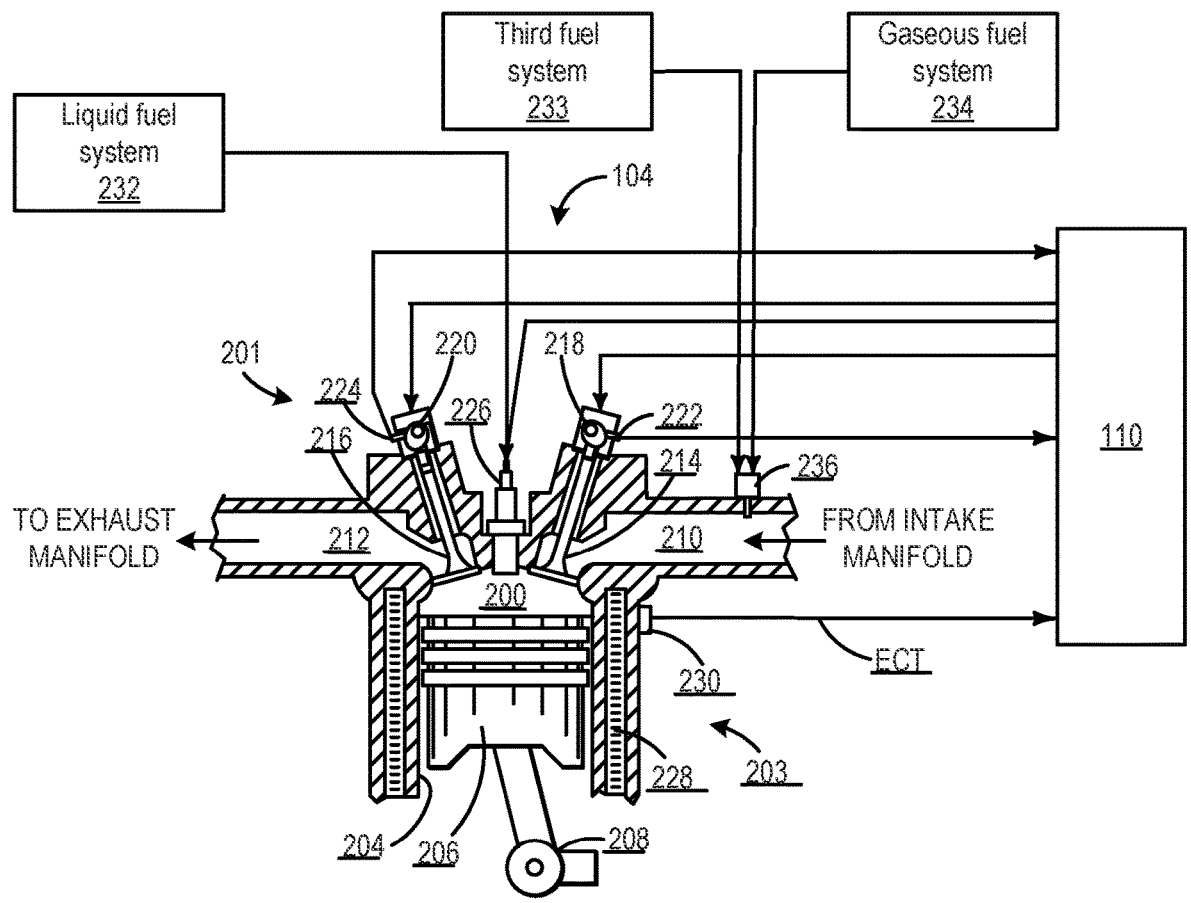
FIG. 2 shows a schematic diagram of a single cylinder of the engine of FIG. 1.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and liquid fuel injector, described below, and a cylinder block 203.

The engine may be controlled at least partially by a control system including controller 110 which may be in further communication with a vehicle system, such as the vehicle system 100 described above with reference to FIG. 1. As described above, the controller 110 may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller 110 may control the vehicle system by sending commands to various components such as alternator, cylinder valves, throttle, fuel injectors, etc.

The cylinder (i.e., combustion chamber) 200 may include cylinder liner 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake passage 210. The intake passage 210 receives intake air via an intake manifold. The intake passage 210 may communicate with other cylinders of the engine in addition to the cylinder 200, for example, or the intake passage 210 may communicate exclusively with the cylinder 200.

Exhaust gas resulting from combustion in the engine is supplied to an exhaust including an exhaust passage 212. Exhaust gas flows through the exhaust passage 212, to a turbocharger in some embodiments (not shown in FIG. 2) and to atmosphere, via an exhaust manifold. The exhaust passage 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 110 via an actuator 218. Similarly, the exhaust valve 216 may be controlled by the controller 110 via an actuator 220. During some conditions, the controller 110 may vary the signals provided to the actuators 218 and 220 to control the opening and closing of the respective intake and exhaust valves. The position of the intake valve 214 and the exhaust valve 216 may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a first, liquid fuel system 232, including a fuel tank, fuel pumps, and a fuel rail (described in more detail with respect to FIG. 3). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition), or ethanol, or methanol, or DME, or another liquid fuel.

Further, each cylinder of the engine may be configured to receive gaseous fuel (e.g., compressed or liquefied natural gas, ammonia, syngas, hydrogen, ethanol, methanol, DME, etc.) alternative to or in addition to diesel fuel. The gaseous fuel may be provided to cylinder 200 via the intake manifold, as explained below. As shown in FIG. 2, the intake passage 210 may receive a supply of gaseous fuel from a second, gaseous fuel system 234, via one or more gaseous fuel lines, pumps, pressure regulators, etc., located upstream of the cylinder. In some embodiments, gaseous fuel system 234 may be located remotely from engine 104, such as on a different rail car (e.g., on a fuel tender car), and the gaseous fuel may be supplied to the engine 104 via one or more fuel lines that traverse the separate cars. However, in other embodiments gaseous fuel system 234 may be located on the same rail car as engine 104.

A plurality of gas admission valves, such as gas admission valve 236, may be configured to supply gaseous fuel from gaseous fuel system 234 to each respective cylinder via respective intake passages. For example, a degree and/or duration of opening of gas admission valve 236 may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

Figure 3:
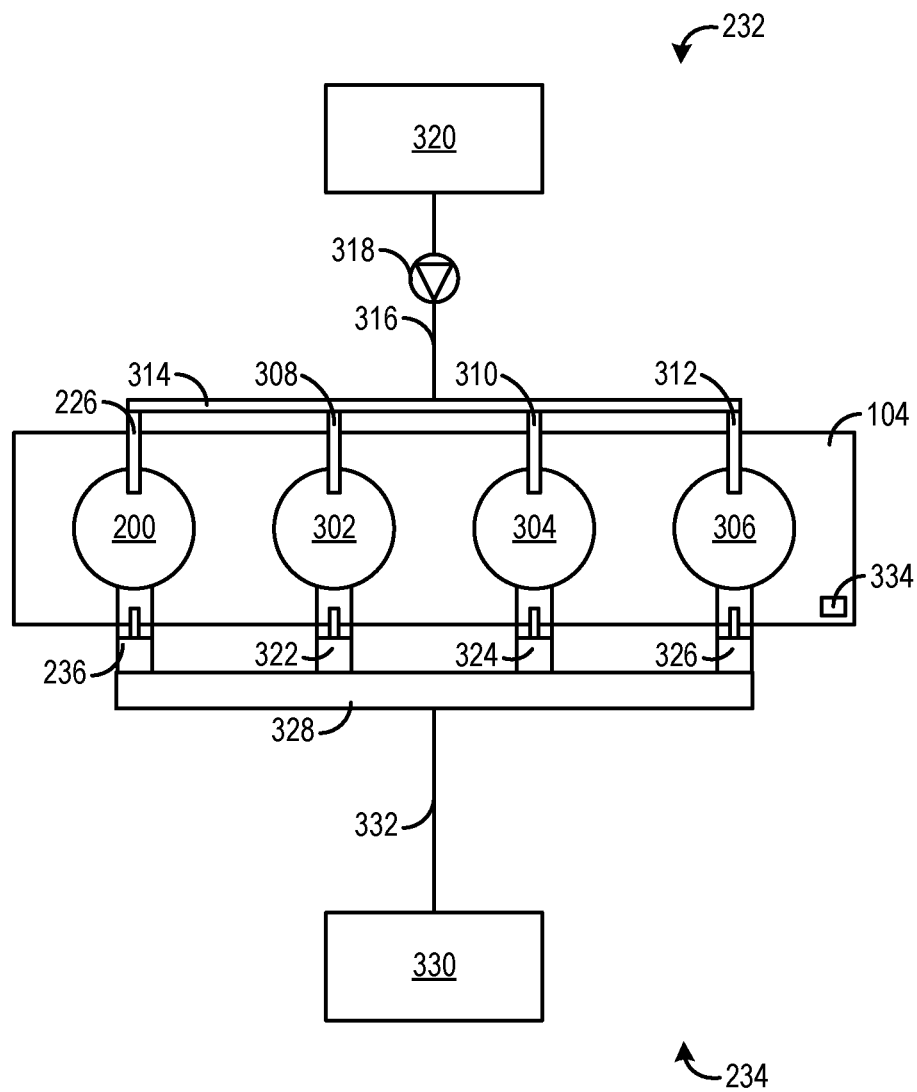
FIG. 3 shows a schematic diagram of the engine of FIGS. 1 and 2.

FIG. 3 illustrates multiple cylinders of engine 104, including cylinder 200, cylinder 302, cylinder 304, and cylinder 306. While four cylinders arranged in-line are illustrated in FIG. 3, such an arrangement is non-limiting, and other engine configurations are possible. For example, engine 104 may be a V-6, V-8, V-12, V-16, I-6, I-8, or other engine type. Engine 104 may be supplied one or more of a first fuel and a second fuel. For example, the first fuel may be liquid fuel from liquid fuel system 232 and the second fuel may be gaseous fuel from gaseous fuel system 234. As such, each cylinder of engine 104 includes a liquid fuel injector, including injector 226 as well as injectors 308, 310, and 312. Each liquid fuel injector is supplied with liquid fuel from a common fuel rail 314. Common fuel rail 314 may be supplied with fuel from liquid fuel tank 320 via supply line 316. The fuel may be provided at a high pressure via one or more fuel pumps, such as pump 318. The liquid fuel in liquid fuel system 232 may be diesel fuel or another liquid fuel, such as gasoline, alcohol, etc. Further, while a common fuel rail system is illustrated in FIG. 3, a non-common rail unit pump injection system may be used.

Each cylinder of engine 104 may similarly include a gas admission valve to supply gaseous fuel, including gas admission valve 236 as well as gas admission valves 322, 324, and 326. Each gas admission valve may be positioned in an intake passage of a respective cylinder, or other suitable location. The gas admission valves may be supplied gaseous fuel, such as natural gas, from a gaseous fuel passage 328. The gaseous fuel passage 328 may receive gaseous fuel from a gaseous fuel tank 330 via a supply line 332. As explained previously, gaseous fuel tank 330 may be located remotely from engine 104. However, in some embodiments, the individual gas admission valves may be dispensed with, and all the cylinders may be supplied with the same gaseous fuel/intake air mixture from an upstream single-point fumigation system.

Each liquid fuel injector of each cylinder, as well as each gas admission valve of each cylinder, may be individually controlled by a controller (such as controller 110) to enable individual cylinder control of the fuel supply. Accordingly, each cylinder may be operated with varying levels of liquid fuel and/or gaseous fuel. In some embodiments, the liquid fuel injectors may be controlled by a different controller than the controller that controls the gas admission valves. Further, in a gaseous fumigation system, rather than controlling the individual gas admission valves, a single gaseous fuel control valve or other gaseous fuel control element may be controlled by the controller to regulate the amount of gaseous fuel admitted to the cylinders.

In an example, a mixture of gaseous fuel and air may be provided to cylinder 200 via intake passage 210 and, in some embodiments, gas admission valve 236. Then, during compression, diesel fuel may be injected to cylinder 200 via fuel injector 226. The diesel fuel may be ignited via compression ignition and subsequently ignite the gaseous fuel via a propagating flame front resulting from the compression ignition.

During a standard combustion event in a multi-fuel engine, the compression ignition of the liquid (e.g., diesel) fuel initiates combustion of a mixture of air and fuel (such as gaseous fuel), causing a combustion flame front to develop that spreads across the cylinder consuming unburned fuel/air mix. The flame front typically moves away from the site of ignition and across the combustion chamber. However, under certain conditions a second flame front may unintentionally and undesirably develop away from the first flame front. The second flame front may occur after the liquid fuel combustion initiates combustion of the gaseous fuel/air mixture and results from compressing and heating of the unburned gaseous fuel/air mixture ahead of the flame front to a high enough level that the end gas mixture auto-ignites ahead of the flame front. If the first flame front meets the second flame front, cylinder vibrations may occur that can result in engine damage. Further, the auto-ignition of end gases may degrade emissions.

To detect the presence of auto-ignition in one or more cylinders of engine 104, one or more vibration and/or acceleration sensors 334 may be present. Auto-ignition sensor 334 may be configured to detect vibrations to the engine caused by auto-ignition. As such, auto-ignition sensor 334 may include an accelerometer or other motion sensor, a microphone or other acoustic sensor, a laser, and/or other sensor. To detect auto-ignition on an individual cylinder level, each cylinder may include an auto-ignition sensor. In other examples, one auto-ignition sensor may be used, and the cylinder(s) undergoing auto-ignition may be identified based on correlation to cylinder firing order/engine position.

Engines configured to operate with both liquid and gaseous fuel may be operated with as much gaseous fuel as possible while still maintaining requested engine power. For example, in standard liquid-fueled engines, such as diesel engines, 100% of produced engine power may be derived from combustion of diesel fuel. In multi-fuel engines, a portion of the engine power may be derived from gaseous fuel while the remaining engine power may be derived from liquid fuel. For example, as much as 80% of produced engine power may be derived from combustion of gaseous fuel, with the remaining 20% of power derived from the combustion of liquid (e.g., diesel) fuel. The amount of gaseous fuel "substituted" for the liquid fuel may be referred to as the substitution ratio. The substitution ratio may reflect the portion of engine power derived from gaseous fuel. For example, a substitution ratio of 80 indicates 80% of the power is derived from gaseous fuel, while a substitution ratio of 50 indicates 50% of the power is derived from gaseous fuel. A substitution ratio of 0 indicates liquid-only operation.

However, as the substitution ratio increases (e.g., as the amount of gaseous fuel present during combustion increases and/or the amount of liquid fuel present decreases), the auto-ignition of the end gases may increase. According to embodiments described herein, auto-ignition of end gasses may be monitored (based on output from the auto-ignition sensor, for example) and if auto-ignition is detected, the substitution ratio may be decreased until the auto-ignition ceases. Once the auto-ignition has stopped, the substitution ratio may be increased again until a maximum desired substitution ratio that does not produce auto-ignition is identified.

Thus, the present disclosure may provide one or more methods for adjusting operating parameters in response to combustion conditions during a certain substitution rate. The substitution rate is based on a mixing of a first fuel and a second fuel. In one example, the first fuel may be a liquid fuel and the second fuel may be a gaseous, wherein the liquid fuels may include one or more of diesel, gasoline, urea, HDRD, alcohol, kerosene, and the like. The gaseous fuels may include ammonia, syn-gas, hydrogen, and the like. The methods may include adjusting the substitution rate in response auto-ignition, adjusting an injection timing of a liquid fuel, or adjusting a flow of pre-mixed fuels. Additionally or alternatively, the first fuel may comprise more carbon than the second fuel. In some examples, each of the first and second fuels may be liquid. For example, the first fuel may be diesel and the second fuel may be urea.

Figure 4:
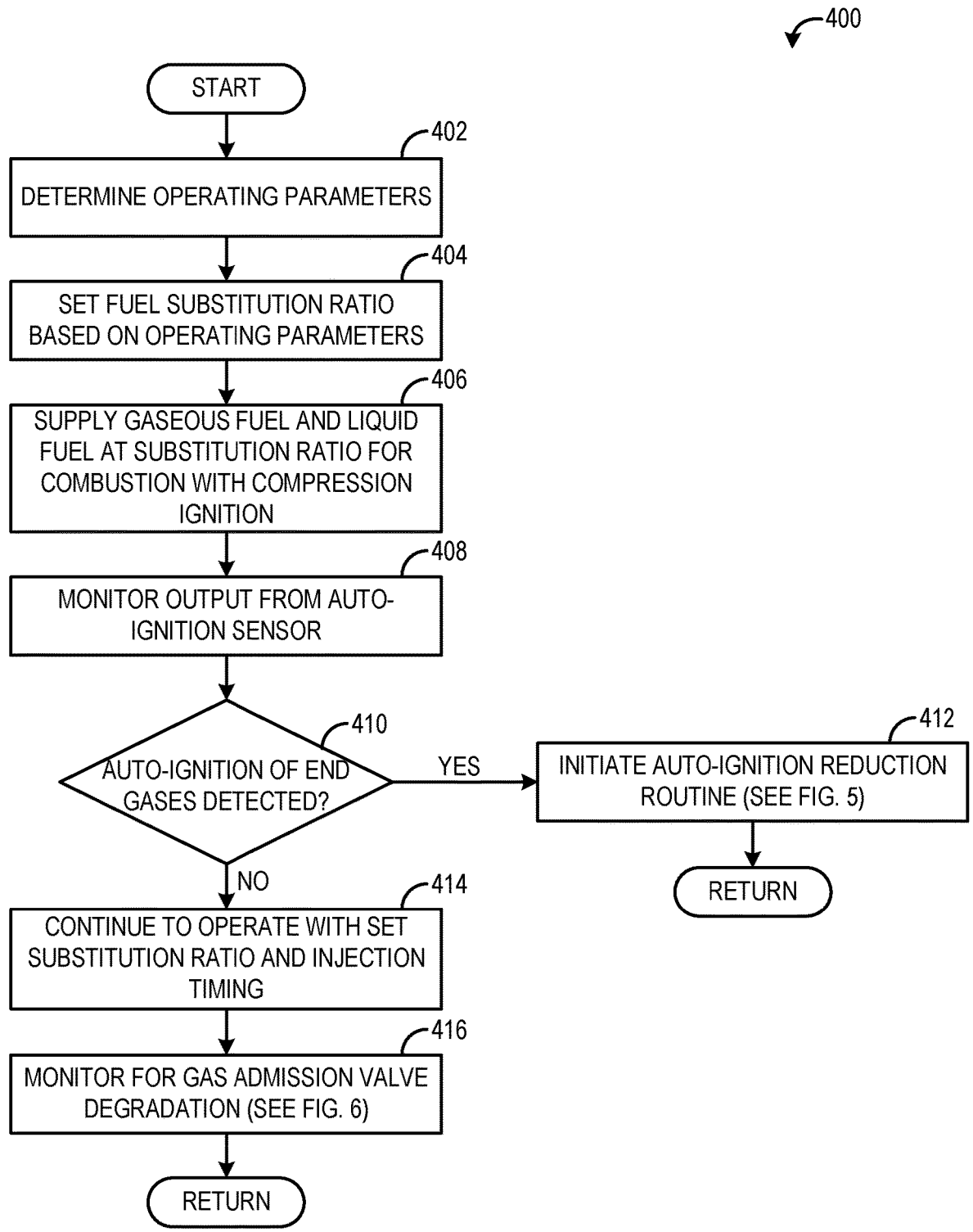
FIGS. 4-6 are flow charts illustrating methods for controlling the engine of FIGS. 1-3, according to an embodiment of the invention.

FIG. 4 is a flow chart illustrating a method 400 for controlling a multi-fuel engine configured to operate with one or more of a first fuel and a second fuel, such as engine 104 of FIGS. 1-3. The first fuel is a liquid fuel and the second fuel is a gaseous fuel in the example of method 400. Method 400 may be carried out according to non-transitory instructions stored in the memory of a control system, such as controller 110. At 402, method 400 includes determining engine operating parameters. The determined engine operating parameters may include engine speed, engine load, current fuel substitution ratio, relative fuel levels in each fuel tank, etc. At 404, method 400 includes setting a fuel substitution ratio based on the operating parameters. The substitution ratio may be set based on engine temperature, desired fuel type, notch throttle position, relative fuel levels in each fuel tank (e.g., if the level of gaseous fuel is below a threshold, more liquid fuel may be used), vehicle location (e.g., whether the vehicle is in a tunnel), and/or other parameters. At 406, the gaseous and/or liquid fuel is supplied to each cylinder of the engine at the set substitution ratio. In some examples, the set substitution ratio may be the same for all cylinders. In other examples, one or more cylinders may have different substitution ratios.

If the substitution ratio is greater than zero (e.g., if at least some gaseous fuel is supplied), the gaseous fuel may be premixed with intake air and combusted due to compression ignition of the injected liquid fuel. The liquid fuel may be supplied via stratified injection, where the liquid fuel is not homogeneous throughout the combustion chamber, but instead varies in a controlled way across the volume of the cylinder. For example, the liquid fuel may be injected into a particular volume of the combustion chamber (e.g., piston crown). The liquid fuel may be injected at a prescribed time during the combustion cycle (such as the end of the compression stroke or beginning of the power stroke) such that the liquid fuel ignites quickly after injection due to increased cylinder temperature at high compression levels. The ignited liquid fuel may then ignite the premixed gaseous fuel and air.

At 408, output from one or more auto-ignition sensors is monitored to determine if auto-ignition is present in any of the cylinders. As explained above, the auto-ignition sensor (such as auto-ignition sensor 334) may detect engine vibrations resulting from auto-ignition of cylinder end gases (e.g., ignition of gaseous fuel and air ahead of the flame front resulting from the ignition of the injected liquid fuel). The detected vibrations that indicate auto-ignition may be vibrations above a threshold level of normal engine vibrations, and may vary based on engine speed or other parameters. At 410, method 400 determines if auto-ignition of end gases is detected in at least one cylinder. If auto-ignition is detected, method 400 proceeds to 412 to initiate an auto-ignition reduction routine, which is explained below with respect to FIG. 5.

If auto-ignition is not detected, method 400 proceeds to 414 to continue to operate with the set substitution ratio and liquid fuel injection timing. At 416, method 400 optionally includes monitoring for gas admission valve degradation, which is explained below with respect to FIG. 6.

Figure 5:
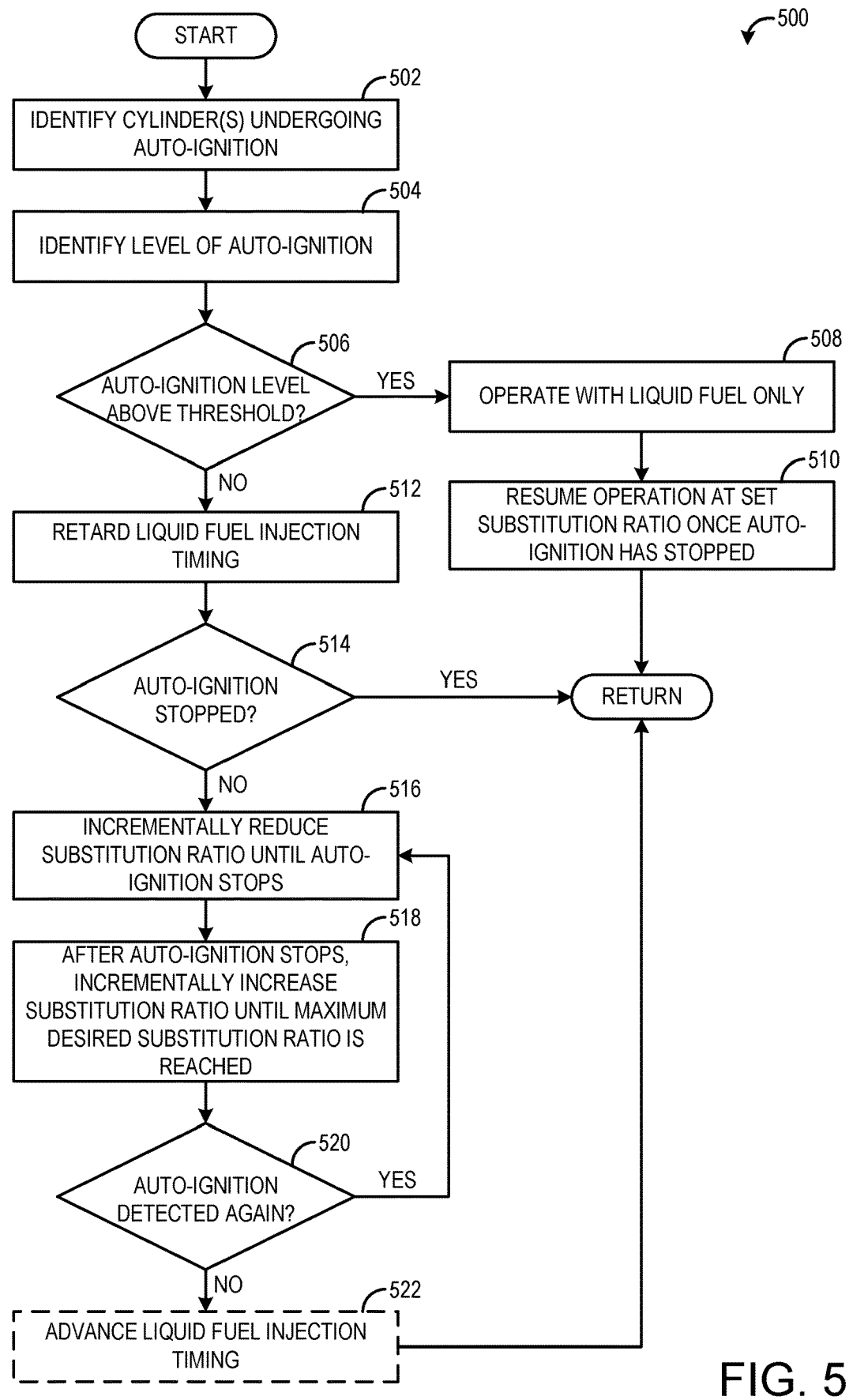

FIG. 5 is a flow chart illustrating a routine 500 for reducing auto-ignition. Routine 500 may be executed in response to an indication of auto-ignition, as explained above with respect to method 400. Routine 500 includes, at 502, identifying the cylinder(s) undergoing auto-ignition. As explained above, cylinder identification may include determining which auto-ignition sensor is indicating auto-ignition is occurring, if more than auto-ignition sensor is present, and/or correlating the timing of the detected auto-ignition to each cylinder's predetermined firing time.

Then, for each cylinder where auto-ignition has been detected, routine 500 includes identifying the level of auto-ignition at 504. The level of auto-ignition may be based on the intensity, frequency, etc., of the vibrations detected by the auto-ignition sensor. At 506, routine 500 determines if the auto-ignition level is above a threshold level. The threshold level may be a high level of auto-ignition that may cause engine degradation if allowed to continue, and/or may be a level of auto-ignition that may be difficult to reduce in a timely manner. If the auto-ignition level is above the threshold, routine 500 proceeds to 508 to operate with liquid fuel only (e.g., only the first fuel), and shut down the supply of gaseous fuel. The supply of gaseous fuel may be shut down to all the cylinders, or only to the cylinder(s) undergoing auto-ignition. To maintain engine power demand, the amount of liquid fuel supplied to the cylinders is increased. At 510, operation at the set substitution ratio (e.g., including a supply of gaseous fuel) may be resumed once auto-ignition has stopped for a predetermined amount of time. Routine 500 then ends.

Returning to 506, if it is determined that the auto-ignition level is not above the threshold level, routine 500 proceeds to 512 to retard liquid fuel injection timing. In some examples, the liquid fuel injection timing may be retarded by predetermined amount. In other examples, the liquid fuel injection timing may be incrementally retarded until auto-ignition stops. In still further examples, the liquid fuel injection timing may be maintained, and routine 500 may immediately proceed to 516, explained below.

The liquid fuel may be injected during one or more strokes of the combustion chamber. In one example, the liquid fuel is injected during an intake stroke and near a transition between a compression stroke and an expansion stroke. In one example, retarding the liquid fuel injection timing includes retarding only the liquid fuel injection during the intake stroke. In one example, additionally or alternatively the liquid fuel injection during the intake stroke may be omitted and only the liquid fuel injection during near the transition may be executed to reduce a combustibility of the gaseous fuel mixture.

After adjusting the liquid fuel injection timing, routine 500 determines, at 514, if the auto-ignition has stopped. If yes, routine 500 ends. If the retarding of the liquid fuel injection timing has not stopped the auto-ignition (and, in some examples, if the injection timing can be retarded no more), routine 500 proceeds to 516 to incrementally reduce the substitution ratio until the auto-ignition stops. The substitution ratio may be reduced in a suitable manner. For example, the substitution ratio may be reduced by a predetermined amount, such as 5%, and the engine may be monitored for auto-ignition after each incremental reduction. To reduce the substitution ratio, the amount of supplied gaseous fuel may be reduced, the amount of supplied liquid fuel may be increased, or both. When the substitution ratio is decreased, engine power is maintained via an increase in the amount of liquid fuel supplied, for example. In some examples, the substitution ratio may be decreased to zero.

At 518, after auto-ignition has stopped, the substitution ratio may be incrementally increased back towards the set substitution ratio. However, to ensure auto-ignition does not occur again, the substitution ratio may be incremented by a smaller amount, such as 2%. Further, the substitution ratio may be increased to a ratio closer to but lower than the set substitution ratio. The substitution ratio may be increased until a maximum desired substitution ratio is reached (such as the set substitution ratio), or until auto-ignition occurs again. If auto-ignition occurs again, as determined at 520, routine 500 loops back to 516 to again incrementally decrease the substitution ratio until the auto-ignition stops. The process of reducing the substitution ratio until the auto-ignition stops and subsequently increasing the substitution ratio may be repeated until a maximum substitution ratio that is as close to the set substitution ratio as possible but does not cause auto-ignition is reached.

If, at 520, auto-ignition is not detected again, routine 500 optionally includes advancing the liquid fuel injection timing back towards the original (non-retarded) injection timing. Routine 500 then ends.

Thus, routine 500 mitigates auto-ignition of end gases following compression ignition of injected liquid fuel by first retarding the injection timing of the liquid fuel. The liquid fuel injection timing may be initially set to within a margin that prevents the auto-ignition without causing misfire and meets designated emissions levels. If auto-ignition following compression ignition is detected, the injection timing may be retarded. If the retarded injection timing does not reduce the auto-ignition, the substitution ratio may be decreased (e.g., less gaseous fuel and/or more liquid fuel may be supplied). After the auto-ignition has stopped, either the injection timing may be advanced again, the substitution ratio may be increased again, or both, so that the injection timing and substitution ratio are as close to the optimal, predetermined settings as possible without causing the auto-ignition following compression ignition.

The control of liquid fuel injection timing and gaseous fuel substitution ratio may be made on a per-cylinder basis in some embodiments. Accordingly, if only one cylinder is undergoing significant auto-ignition following compression ignition, only the injection timing and/or substitution ratio of that cylinder may be adjusted, while the remaining cylinders are maintained at the optimal settings. For example, one or more of an amount of gaseous fuel supplied and an amount of liquid fuel supplied to only one cylinder may be adjusted, while the remaining cylinders are maintained at the optimal settings. However, in some embodiments, even if auto-ignition is not detected in each cylinder (e.g., if auto-ignition is detected in only a subset of the cylinders), each cylinder may undergo the same injection timing and/or substitution ratio adjustment to control the detected auto-ignition. For example, each cylinder may undergo the same gaseous fuel adjustment and/or liquid fuel adjustment to control the detected auto-ignition. Further, the intensity of the auto-ignition may be monitored. In some examples, if the auto-ignition is of relatively high intensity, it may be reduced by stopping the gaseous fuel supply (either to the cylinder undergoing the auto-ignition, or to all cylinders). Then, once conditions resulting the auto-ignition have changed (e.g., engine temperature has decreased), the gaseous fuel supply may be resumed.

Figure 6:
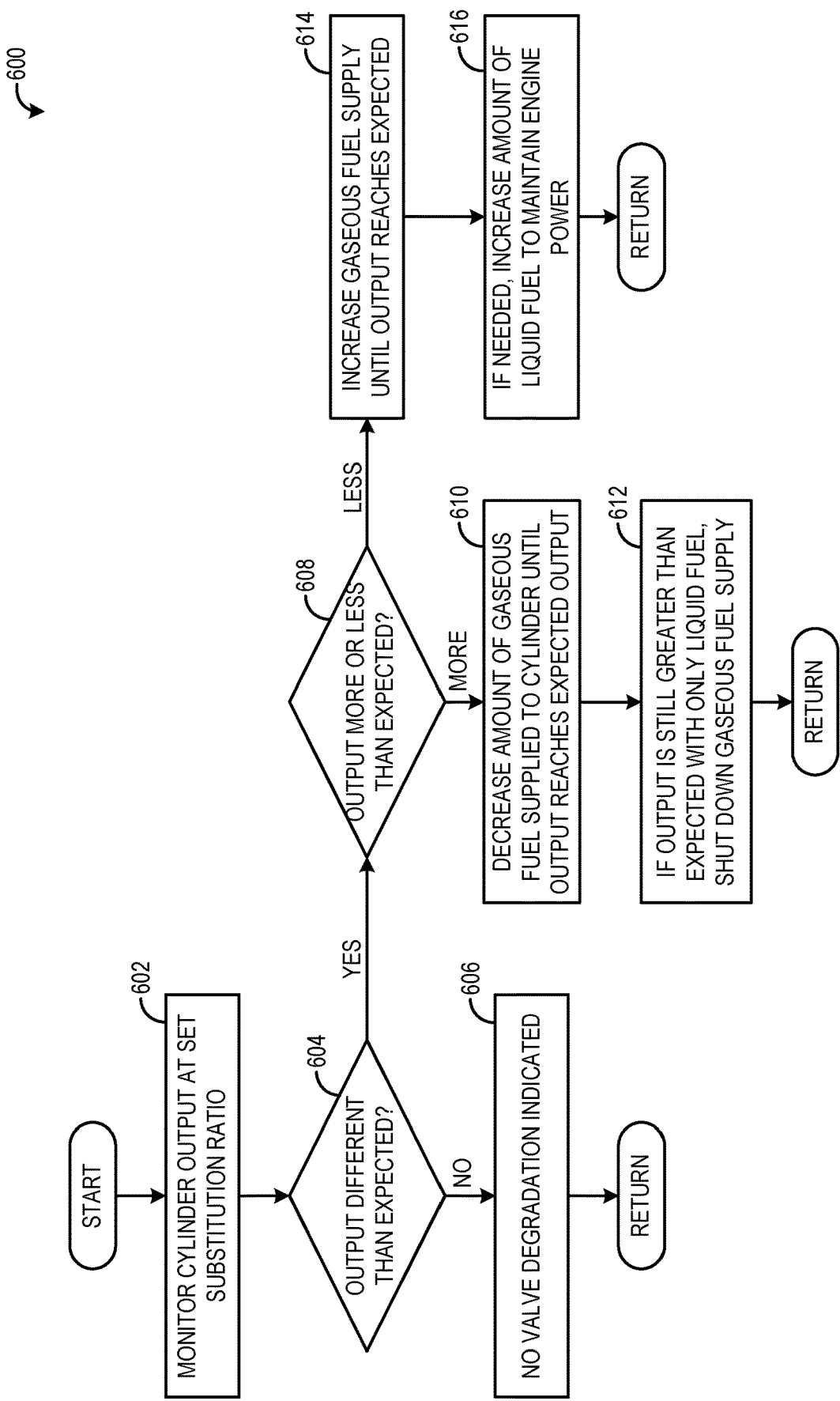

Turning now to FIG. 6, a routine 600 for monitoring gas admission valve degradation status is illustrated. Routine 600 may be executed during gaseous fuel operation without auto-ignition, such as during the method 400 described above, in an engine system that includes a plurality of gas admission valves, each for admitting gaseous fuel to a respective cylinder. At 602, routine 600 includes monitoring cylinder output at the set substitution ratio. The cylinder output may be a suitable output that indicates the power produced by the cylinder during combustion, and may include individual cylinder exhaust temperature, overall engine power (e.g., load placed on alternator), engine speed, or other parameter. At 604, the produced output is compared to an expected output for the given substitution ratio. If the output is not different than the expected output, routine 600 proceeds to 606 to indicate that no degradation to the gas admission valves is present, and routine 600 ends.

If the produced cylinder output is different than expected, routine 600 proceeds to 608 to determine if the produced output is more or less than the expected output. If the produced output is more than expected, routine 600 proceeds to 610 to decrease the amount of gaseous fuel, and in some embodiments liquid fuel, supplied to the cylinder until the cylinder output reaches the expected output. At 612, if the produced output is still greater than the expected output, the gaseous fuel supply to that cylinder may be shutdown, as the gas admission valve may be stuck open. In some embodiments, the cylinder may be operated with only liquid fuel, or the cylinder may be totally shut down and no fuel supplied to the cylinder. Further, a default action may be taken, indicating degradation of the gas admission valve (e.g., a diagnostic code set, indicator lamp lit, etc.). Routine 600 then returns.

If the produced cylinder output is less than the expected output, routine 600 proceeds to 614 to increase the gaseous fuel supply until the output reaches the expected output. At 616, the amount of liquid fuel supplied to the cylinder may also be increased to maintain engine power. For example, if the gas admission valve is stuck closed, an adequate supply of gaseous fuel may not be provided to maintain requested engine power. To compensate, additional liquid fuel may be supplied. Further, a default action may be taken, indicating degradation of the gas admission valve (e.g., a diagnostic code set, indicator lamp lit, etc.). Routine 600 then returns.

Figure 7:
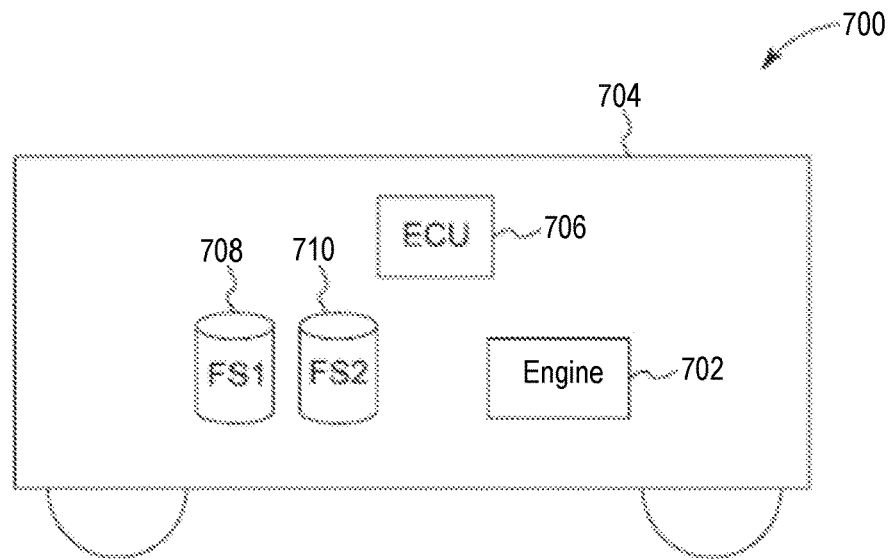
FIG. 7 shows one embodiment of a multi-variable dynamic control system of a multi-fuel engine.

Turning now to FIG. 7, it illustrates one embodiment of a multivariable dynamic control system 700 of a multi-fuel engine 702. The engine is shown as being disposed in a mobile powered system such as a vehicle 704, but optionally may be an engine disposed in another type of powered system, such as a power-generating system (e.g., a power plant). The vehicle can represent an automobile, a truck, a rail vehicle (e.g., locomotive), marine vessel, off-highway vehicle (e.g., a mining vehicle or other vehicle that is not legally permitted or that is not designed for operating on public roadways), or the like. The system includes an engine control unit 706 that controls operation of the engine. The engine control unit represents hardware circuitry that includes and/or is connected with one or more processors (e.g., one or more microprocessors, field programmable gate arrays, and/or integrated circuits) that examine the inputs described herein to determine engine operating conditions or parameters indicative of increased likelihoods of engine knock and that can generate control signals to control the flow of premixed and/or non-premixed combustion fuel to the engine to reduce or eliminate the likelihood of engine knock. The engine control unit optionally is connected with one or more input devices (e.g., throttles, levers, touchscreens, etc.) to receive operator input to control operation of the engine. The engine and engine control unit of FIG. 7 may be a non-limiting example of the engine and controller of FIG. 1.

The engine control unit controls the flow of premixed combustion fuel to the engine from a first combustion fuel source or container 708 ("FS1" in FIG. 7) of combustion fuel and controls the flow of non-premixed combustion fuel to the engine from a second combustion fuel source or container 710 ("FS2" in FIG. 7) of combustion fuel. The containers represent tanks (pressurized or unpressurized) or other bodies that contain the combustion fuels during operation of the powered system. The premixed combustion fuel may include two or more of gasoline, ethanol, methanol, syngas, natural gas, liquefied petroleum gas, ammonia, HDRD, biodiesel, and/or hydrogen gas. With respect to hydrogen gas, the premixed combustion fuel may be hydrogen gas that is consumed by the engine to perform work (e.g., rotate a shaft, propel a vehicle, use to generate current, etc.). This is in contrast to stabilizing fuels formed from hydrogen that are added to stabilize combustion fuel, but that are not consumed by an engine to perform work. The non-premixed combustion fuel can be diesel fuel, kerosene, JP8 jet fuel, or the like. Alternatively, the non-premixed combustion fuel can be hydrogen. Additionally or alternatively, the non-premixed fuel may include ammonia, HDRD, or biodiesel. Optionally, the engine control unit can control the flow of combustion fuel from one or more additional containers and/or one or more additional types of combustion fuel (from one or more additional containers of combustion fuel) to the engine.

Figure 8:
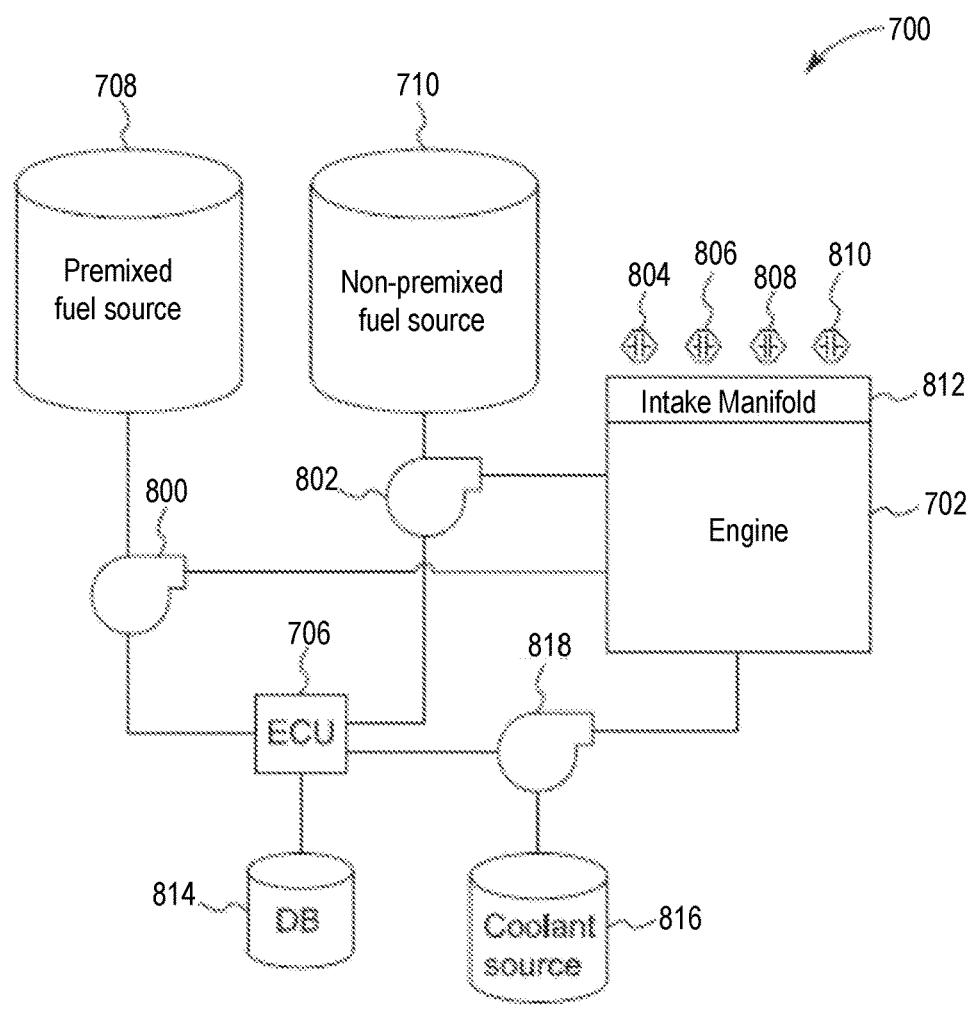
FIG. 8 shows additional component of the control system of FIG. 1.

FIG. 8 illustrates additional components of the control system shown in FIG. 7. The engine control unit can control the flow of the different types of combustion fuel from the containers ("Premixed fuel Source" and "Non-premixed Fuel Source" in FIG. 8) by generating and sending control signals to pumps 800, 802 associated with the containers. The different pumps can control the rate at which the combustion fuels in the different containers flow to cylinders of the engine via different conduits.

The engine control unit monitors one or more operating conditions of the multi-fuel engine and/or powered system 704 (shown in FIG. 7) while the engine consumes a mixture of air, the non-premixed combustion fuel, and the premixed combustion fuel. The engine control unit can monitor the operating condition(s) by examining signals output by one or more sensors 804, 806, 808, 810. Although four sensors are shown in FIG. 8, the system may include as few as a single sensor, or more than four sensors. Each sensor may measure a single operating condition of the system or engine, or may measure multiple operating conditions of the system or engine.

For example, one or more of the sensors can include a thermocouple that measures the temperature of the airflow in an intake manifold 812 of the engine. One or more of the sensors can include a pressure sensor that measures the pressure in the manifold of the engine and/or a pressure sensor that measures the pressure in one or more cylinders of the engine. Optionally, one or more of the sensors can include an airflow sensor that measures the amount or rate of air flowing in the manifold. The sensors can include a flow sensor that measures the rate at which the non-premixed combustion fuel flows from the container and/or the rate at which the premixed combustion fuel flows from the container into the cylinders of the engine. The sensors can include tachometers or other speed sensors that measure the speeds at which the engine and/or turbochargers operate. The sensors can include a thermocouple that measures the temperature of exhaust out of the engine and/or cylinders of the engine. Optionally, the exhaust temperature can be calculated from the air flow, fuel flow, and combustion timing instead of directly measuring the exhaust temperature.

These operational conditions are determined by the engine control unit based on sensed parameters represented by data or signals output by the one or more sensors. One or more alternative or additional operational conditions can be obtained by the engine control unit from a memory device 814 ("DB" in FIG. 8) of the system and/or from calculations performed by the arithmetic logic unit of one or more of the processors of the engine control unit. The memory can be a tangible and non-transitory computer readable storage medium, such as a computer hard drive, flash drive, optical disk, or the like. The operational conditions obtained from the memory and/or calculated by the engine control unit based on other sensed operational conditions can be referred to as derived operational conditions. The operational conditions can include fuel injection timing of the engine, the autoignition delay that is calculated by the engine control unit based on the operational conditions, the air-to-fuel ratio and/or oxygen-to-fuel ratio calculated by the engine control unit, the fuel substitution ratio, or the like.

Optionally, the engine control unit monitors, obtains, or otherwise determines at least one of the operating conditions using information provided by or otherwise input by an operator of the engine and/or the vehicle that includes the engine.

The engine control unit can determine a designated autoignition delay for the mixture of the air, the non-premixed combustion fuel, and the premixed combustion fuel. For example, a table, chart, or other memory structure stored in the memory and/or an internal memory of the engine control unit can associate different combinations of mixtures of air, non-premixed combustion fuel, and premixed combustion fuel with different designated autoignition delays. In one embodiment, the designated autoignition delays stored in the memory are determined from a mathematical model of the thermochemistry of the engine. This model can be determined by evaluating the time between introduction of the premixed combustion fuel into a cylinder of the engine (or another engine of the same make, model, manufacturing year, or the like) and spontaneous combustion of the mixture of air and the premixed combustion fuel under different experimentally controlled operating conditions. Alternatively, this model can be determined by evaluating the amount of time desired for spontaneous combustion when the premixed combustion fuel and air are at a thermodynamic condition that is representative of the operating condition of the engine (e.g., amount of time at the temperature and pressure associated with top-dead-center (TDC) or peak cylinder pressure). The mixtures of air, non-premixed combustion fuel, and premixed combustion fuel, and the autoignition delays measured or calculated for these mixtures can be recorded, and the autoignition delays for other, different mixtures of air, non-premixed combustion fuel, and premixed combustion fuel can be extrapolated from the experimentally-determined or modeled autoignition delays. This extrapolation can be performed using a transfer function adapted to the experimental measurements of the autoignition delays.

The engine control unit, or controller, can select a designated autoignition delay that is associated with a low likelihood of autoignition of the air and premixed combustion fuel mixture. The designated autoignition delays stored in the memory and/or the engine control unit can represent different likelihoods of ignition of the premixed combustion fuel and air mixture in a cylinder (e.g., engine knock). For example, longer autoignition delays can represent smaller likelihoods of knock as the cylinder is more likely to complete a combustion cycle before the premixed combustion fuel and air mixture spontaneously ignites, while shorter autoignition delays can represent greater likelihood of knock as the cylinder is less likely to complete a combustion cycle before the premixed combustion fuel and air mixture spontaneously ignites.

The engine control unit can select the designated autoignition delay having a relatively low likelihood of autoignition. For example, the engine control unit can select a designated autoignition delay that is longer than the time from introduction of the premixed combustion fuel into a cylinder and normal combustion event (not knocking) of the premixed combustion fuel, non-premixed combustion fuel, and air mixture in the cylinder in the combustion cycle of the cylinder.

The engine control unit can calculate an upper limit on the amount of premixed combustion fuel that is supplied to the multi-fuel engine based on the operating conditions (measured and/or derived) and the designated maximum allowable autoignition delay that is selected. The engine control unit can examine the conditions in which the engine is operating and the designated autoignition delay to determine what mixture of air and premixed combustion fuel is associated with the same or similar (such as within 1%, 3%, or 5% of the same value) operating conditions. For example, the engine control unit can refer to the transfer function, list, table, or other structure in the memory that associates different operating conditions with different mixtures of air, premixed combustion fuel, and non-premixed combustion fuel and with different autoignition delays. The conditions in the memory that are the same as or similar to the operating conditions monitored by the engine control unit and that are associated with the same or similar autoignition delay can be used to find the corresponding mixture of air, premixed combustion fuel, and non-premixed combustion fuel in the memory. The amount of premixed combustion fuel in this mixture can then be identified by the engine control unit as the upper limit on premixed combustion fuel. Optionally, the engine control unit can determine the upper limit on premixed combustion fuel to be less than this amount of premixed combustion fuel. Decreasing the upper limit to below this amount of premixed combustion fuel can provide a buffer to further reduce or eliminate the likelihood of engine knock.

The amount of buffer utilized may vary depending on the ambient conditions or based on autoignition measurements. For example, the engine controller can make use of a knock sensor to detect if knock is occurring in any of the engine cylinders. If the engine controller is detecting a higher frequency of knocking cycles than expected based on the determined autoignition delay, the buffer may be increased either temporarily or permanently to reduce the frequency of knocking.

The engine control unit can restrict or change operation of the engine to ensure that no more premixed combustion fuel is supplied to the engine than this upper limit. For example, the engine control unit can change the premixed combustion fuel substitution rate at which the premixed combustion fuel is substituted for the non-premixed combustion fuel being supplied to the engine at the same time. If the engine is receiving more than this upper limit, the engine control unit can reduce the rate at which the premixed combustion fuel is supplied to the engine. The engine control unit can proceed with increasing or decreasing the rate at which the premixed combustion fuel is supplied to the engine with the non-premixed combustion fuel so long as the amount of the premixed combustion fuel does not exceed the upper limit that is determined.

The upper limit can change as operating conditions change. For example, the engine control unit can continuously determine or change the upper limit to maintain the selected autoignition delay in force while the operating conditions of the engine change. This can allow for the engine control unit to modify the premixed combustion fuel substitution rate of the engine 702 in real time as the operating conditions of the engine change.

In one embodiment, the engine control unit can change the premixed combustion fuel substitution rate to reduce or eliminate the likelihood of engine knock without eliminating the flow of non-premixed combustion fuel to the engine. For example, the engine control unit can maintain the upper limit at a value below 100% so that at least some non-premixed combustion fuel is supplied to the engine (in addition to the premixed combustion fuel).

In one embodiment, the engine control unit can change the premixed combustion fuel substitution rate to maximize the substitution rate while maintaining the autoignition delay to be longer than a threshold without eliminating the flow of non-premixed combustion fuel to the engine. For example, the engine control unit can maintain the lower limit at a value above zero (e.g., a non-zero value) so that at least some non-premixed combustion fuel is supplied to the engine (in addition to premixed combustion fuel) during all conditions.

The engine control unit 706 can change the premixed combustion fuel substitution rate without changing the operating speed of the engine. For example, the engine can continue operating at the same (or faster) speed to generate the same (or more) power when the premixed combustion fuel supply rate is reduced.

Optionally, the engine control unit can monitor the operating conditions of the engine and determine the autoignition delay associated with the operating conditions. The engine control unit can refer to the memory to calculate or determine the autoignition delay associated with the current or most recently obtained operating conditions. The engine control unit can direct an output device, such as a monitor, touchscreen, speaker, light, or the like, to visually and/or audibly present information representative of the autoignition delay that is calculated or determined. For example, the engine control unit can present the autoignition delay, the likelihood of engine knock associated with the autoignition delay, or the like, on a display to the operator of the powered system so that the operator can decide whether to change operation of the engine to avoid engine knock. The operator may decrease a throttle of the engine, derate the engine (e.g., decrease the maximum allowable power output of the engine regardless of throttle setting), move the powered system to a location with cooler ambient air, adjust the substitution rate, and the like. The operator can continue monitoring changes in the autoignition delay in real time to change how the system and/or engine operates to avoid or prevent engine knock.

Alternatively, the engine control unit can automatically change operation of the powered system and/or engine based on the autoignition delays that are being determined in real time by the engine control unit. As one example, if the autoignition delay falls below a designated threshold (e.g., the length of time between introduction of premixed combustion fuel into a cylinder of the engine and completion of the combustion cycle of the cylinder), then the engine control unit can automatically implement one or more responsive actions. These actions can include automatically derating the engine, automatically decreasing a throttle setting, speed, or power output of the engine, or the like. In one embodiment, the system includes a coolant source 216, such as a container of water or other coolant. A pump 218 connected with the coolant source can pull or push the coolant out of the source and into (via one or more conduits) one or more cylinders of the engine. For example, the engine control unit can control the pump to direct coolant into one or more cylinders, such as by spraying water into the cylinders. Directing the coolant into the cylinders can cool the temperature inside the cylinders which, in turn, can increase the autoignition delay (and decrease the likelihood of engine knock). The engine control unit can automatically spray coolant into one or more cylinders responsive to the autoignition delay falling below a threshold to reduce or eliminate the likelihood of engine knock.

Figure 9:
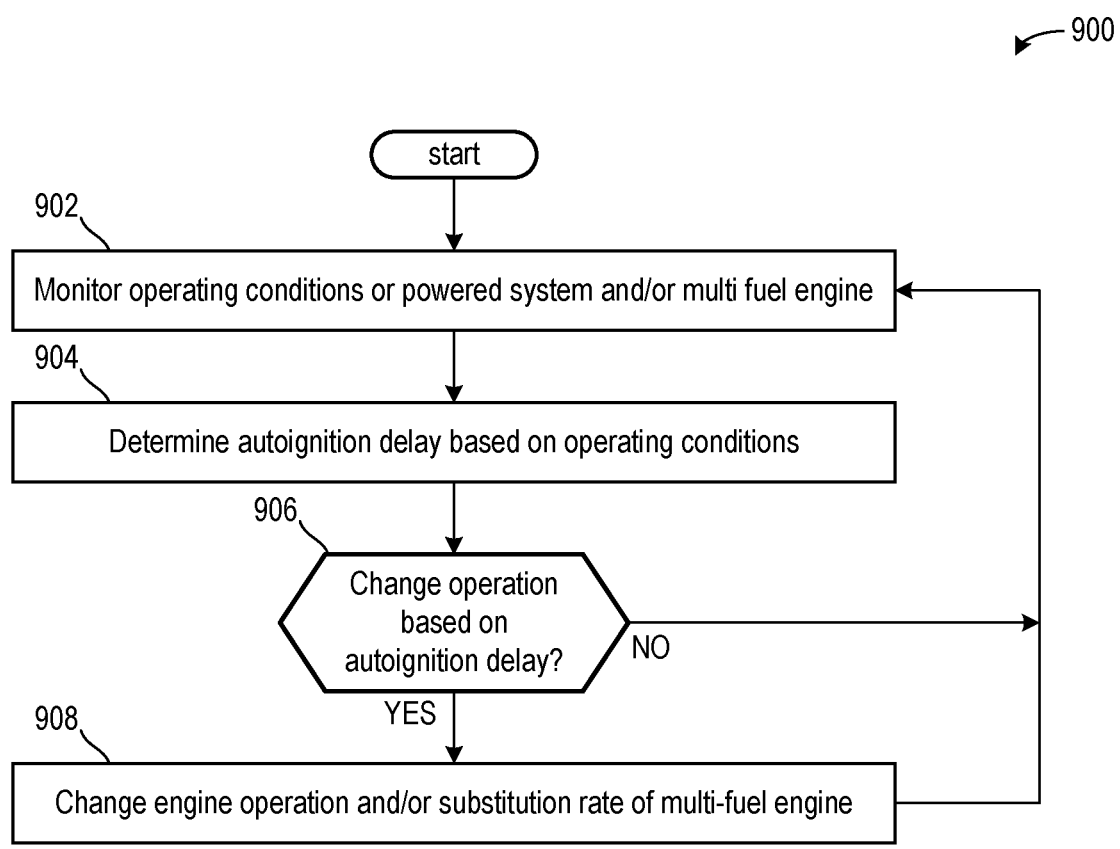
FIG. 9 shows a flowchart of one embodiment of a method for dynamically controlled premixed fuel substitution rates of the multi-fuel engine.

FIG. 9 illustrates a flowchart of one embodiment of a method 900 for dynamically controlling premixed combustion fuel substitution rates of a multi-fuel engine. The method can represent the operations performed by the processor(s) of the engine control unit in connection with the multi-fuel engine described herein. At step 902, operating conditions of a powered system and/or a multi-fuel engine of the powered system are monitored. For example, the manifold airflow temperature of the engine, the manifold airflow pressure of the engine, the air flow into or out of the engine, the rate at which non-premixed combustion fuel is supplied to the engine or one or more cylinders of the engine, the speed at which the engine is operating, the timing of fuel injection into the cylinder(s) of the engine, an autoignition delay that is calculated, an air-to-fuel ratio of the engine, the temperature of the engine exhaust, a turbocharger speed, an oxygen-to-fuel ratio of the engine, the fuel substitution ratio of the engine, and/or a cylinder pressure of the engine can be measured.

At step 904, an autoignition delay of the engine is determined. This delay can be based on the operating conditions that are monitored, as well as previous measurements or calculations of autoignition delays based on the same or other operating conditions, and optionally can be based on a transfer function, as described above. At step 906, a determination is made as to whether operation of the powered system and/or the multi-fuel engine is to be changed based on the autoignition delay that is calculated. For example, if the autoignition delay is too short, then operation of the powered system and/or engine may demand to be modified to prevent engine knock. As a result, flow of the method can flow toward step 908. But, if the autoignition delay is sufficiently long to avoid engine knock, then flow of the method can return toward step 902. This allows for the repeated monitoring of operating conditions to determine whether these operating conditions indicate a likelihood of engine knock.

At step 908, operation of the engine and/or powered system is modified. As one example, the premixed combustion fuel substitution rate of the engine is modified. The amount of premixed combustion fuel delivered to the engine can be reduced, while the amount of non-premixed combustion fuel delivered to the engine is increased (to compensate for the decrease in premixed combustion fuel). Reducing the amount of premixed combustion fuel to the engine can increase the autoignition delay and decrease the likelihood that engine knock occurs. As another example, the engine can be derated so that the engine operates at a lower power, lower temperature, or lower pressure and thereby reduces the likelihood of engine knock. In another example, coolant can be sprayed into cylinders of the engine to reduce the temperature in the cylinders, and thereby decrease the likelihood of engine knock from occurring. Flow of the method can return toward step 902 for the repeated monitoring of operating conditions to determine whether these operating conditions indicate a likelihood of engine knock.

In one example, the non-premixed fuel source may be directly injected to the engine via the fuel injector 226 and the premixed fuel source may be provided to the engine via the gas admission valve 236. In this way, the methods 4-6 may be executed in combination with the systems of FIGS. 7 and 8.

In some examples, the premixed fuel source may be included in the systems of FIGS. 1-3 such that there are three fuel containers, a first fuel container housing a first fuel, a second fuel container housing a second fuel, and a third fuel container housing a mixture of the first and second fuels. An injection timing and injection amount of the first fuel, the second fuel, and the pre-mixture of the first and second fuels may be based on a sensed auto-ignition as described above. For example, if auto-ignition is above the threshold level, then a timing of the first fuel injection may be adjusted, a timing of the premixed fuel injection may be adjusted, and/or an amount of the second fuel.

In one embodiment, additionally or alternatively, a system comprises a fuel system configured to supply one or more of a first fuel, a second fuel, and a pre-mixture thereof to at least one cylinder of an engine. The cylinder may be a single cylinder of a plurality of cylinders of the engine. Each cylinder may include a corresponding direct injector and a port-injector or other similar injector positioned to provide fuel to the cylinder from a location outside of the cylinder. A controller may include instructions stored in non-transitory memory thereof that cause the controller to adjust a timing of an injection of the first fuel and maintaining a substitution rate in response to an auto-ignition level being less than or equal to a threshold level. The substitution rate may be incrementally reduced in response to auto-ignition occurring following adjusting the timing of the injection of the first fuel. Incrementally reducing the substitution rate may include reducing the substitution rate by 5% or less, the substitution rate based on a substitution of the second fuel for the first fuel.

The injection of the first fuel is a first injection during an intake stroke of the engine. The timing of the first injection may be retarded, which may reduce the likelihood of auto-ignition. In some examples, the first injection may be further retarded or deactivated if auto-ignition continues to occur. The first fuel may be further provided by a second injection during a compression stroke. If the first injection is deactivated, then the amount of first fuel injected during the second injection may be increased.

In some examples, if auto-ignition continues following adjustments to the injection timing of the first fuel, then adjustments may include increasing an amount of premixed fuel delivered to the engine and decrease an amount of only second fuel delivered to the engine. By doing this, the substitution rate may be reduced. The first fuel and the second fuel comprise two of gasoline, diesel, hydrogenation-derived renewable diesel (HDRD), alcohol, ammonia, bio-diesels, hydrogen, natural gas, kerosene, syn-gas, kerosene, dimethyl ether, and J8 jet fuel. The first fuel is directly injected to the engine, and wherein the second fuel and the pre-mixture are provided to the engine via a valve arranged in an intake of the engine.

An embodiment of a method, comprises injecting a first fuel to a combustion chamber via a direct injector positioned to inject directly into the combustion chamber. The method further includes flowing a different, second fuel to the combustion chamber via a valve positioned to inject toward an intake port of the combustion chamber. In response to a comparison of an auto-ignition to a threshold level, the method includes adjusting a substitution rate of the first fuel and the second fuel and retarding an injection timing of the injection of the first fuel. The second fuel may be flowed as a pre-mixture with the first fuel, wherein the first fuel and the second fuel include two of gasoline, diesel, hydrogenation-derived renewable diesel (HDRD), alcohol, ammonia, bio-diesels, hydrogen, natural gas, kerosene, syn-gas, kerosene, and J8 jet fuel.

The first fuel may be injected without the second fuel during via a direct injector during a first injection and/or a second injection. The first injection may be executed during an intake stroke and a second injection may be executed during a compression stroke. Retarding the injection timing may include retarding the injection timing of one of the first injection or the second injection. In one example, the first injection may be retarder prior to retarding the second injection. Additionally or alternatively, a volume of the first injection may be reduced and a volume of the second injection may be increased. The substitution rate may be maintained in response to the auto-ignition being less than or equal to the threshold level. As such, an amount of the second fuel may be maintained. In some examples, the substitution rate may decrease in response to the auto-ignition being greater than the threshold level, wherein decreasing the substitution rate includes decreasing an amount of second fuel relative to an amount of first fuel. Decreasing the amount of second fuel may include injecting less second fuel and injecting more first fuel. Additionally or alternatively, the amount of injected premixed fuel may be increased and the amount of second fuel injected without the first fuel mixed therewith may be reduced.

The engine is on a vehicle, and wherein the first fuel is a liquid fuel comprising one of diesel, biodiesel, ethanol, methanol, gasoline, hydrogenation-derived renewable diesel, urea, and dimethyl ether, and the second fuel is a gaseous fuel comprising one of natural gas, ammonia, syngas, hydrogen, ethanol, methanol, and dimethyl ether.

A pre-mixture of the first fuel and the second fuel may include where the first fuel is in a liquid or a gaseous state and the second fuel in a liquid or gaseous state. In examples where liquid and gaseous states of the fuels are mixed, the mixing may include mixing the fuels in a fuel tank, in a fuel line, in a fuel pump, in a fuel injector, or the like. In one example, the gaseous fuel may be bubbled into the liquid fuel in a sealed container. In some examples, the container may be pressurized and/or temperature regulated to maintain a homogeneity of the first and second fuels. Additionally or alternatively, separation of the gaseous and liquid fuels may be anticipated, wherein drawing the premixed fuels may include drawing fuel from a lower region of the container and a higher region of the container. The drawing may be empirically determined based on estimated fuel levels within the container to draw a desired amount of the liquid fuel and the gaseous fuel. Furthermore, an estimated dissolution of the gaseous fuel in the liquid fuel may be estimated based on temperature, pressure, driving conditions, liquid fuel levels, and the like. By doing this, a desired amount of fuels may be drawn from the premixed fuel container (e.g., tank). The gaseous and liquid fuels may be remixed downstream of the container and upstream of the cylinder within a fuel line, a fuel pump, or other fuel system component.

An embodiment of a system, comprises a first fuel system fluidly coupled to direct injectors of a plurality of cylinders and configured to supply a first fuel, a second fuel system fluidly coupled to intake port injectors and configured to supply a second fuel different than the first fuel, and a third fuel system 233 fluidly coupled to one of the direct injectors or the intake port injectors and configured to supply a pre-mixture of the first and second fuels. The system further includes a controller with instructions stored on non-transitory memory that cause the controller to in response to a comparison of an auto-ignition to a threshold level adjusting a substitution rate of the first fuel and the second fuel, and retarding an injection timing of the injection of the first fuel. The first fuel is one of diesel, hydrogenation-derived renewable diesel, or biodiesel, and wherein the second fuel is ammonia or hydrogen. Adjusting the substitution rate comprises decreasing an amount of the second fuel and increasing an amount of the first fuel in response to the auto-ignition being greater than the threshold level.

In one embodiment, a method includes monitoring one or more operating conditions of a multi-fuel engine that consumes a mixture of air, a non-premixed combustion fuel, and a premixed combustion fuel, and determining a designated autoignition delay of the mixture of the air, the non-premixed combustion fuel, and the premixed combustion fuel. The designated autoignition delay represents a period of time following injection of the non-premixed combustion fuel and the premixed combustion fuel into a cylinder of the multi-fuel engine before the premixed combustion fuel ignites. The method also can include calculating an upper limit on an amount of the premixed combustion fuel that is supplied to the multi-fuel engine based on the one or more operating conditions that are monitored and the designated autoignition delay that is determined, and controlling flow of the non-premixed combustion fuel into the cylinder of the multi-fuel engine to prevent the amount of the non-premixed combustion fuel that is injected into the cylinder from exceeding the lower, non-zero limit. This embodiment may limit the maximum substitution rate of the premixed combustion fuel to be less than 100% of the combustion fuel supplied to the engine or cylinder.

Optionally, the designated autoignition delay represents a likelihood of engine knock of the multi-fuel engine. Optionally, the non-premixed fuel is diesel fuel, kerosene, JP8, or the like and the premixed combustion fuel is one or more of gasoline, ethanol, methanol, syngas, natural gas, liquefied petroleum gas, or hydrogen gas. Optionally, the one or more operating conditions that are monitored include one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine. Optionally, controlling the flow of the premixed combustion fuel into the cylinder includes reducing the flow of the premixed combustion fuel into the cylinder of the premixed combustion fuel into the cylinder.

Optionally, controlling the flow of the premixed combustion fuel into the cylinder to be less than the upper limit prevents engine knock in the cylinder of the engine. Optionally, the flow of the non-premixed combustion fuel into the cylinder of the engine is controlled to prevent the amount of the non-premixed combustion fuel that is injected into the cylinder from exceeding the lower, non-zero limit without an operating speed of the engine changing.

In one embodiment, a method includes monitoring one or more operating conditions of a multi-fuel engine that consumes a mixture of air, a non-premixed combustion fuel, and a premixed combustion fuel, measuring an amount of the premixed combustion fuel that is supplied to the multi-fuel engine, and calculating an autoignition delay of the mixture of the air, the non-premixed combustion fuel, and the premixed combustion fuel. The autoignition delay represents a period of time following injection of the non-premixed combustion fuel and the premixed combustion fuel into a cylinder of the multi-fuel engine before the premixed combustion fuel ignites during knocking of the engine. The method also includes modifying operation of the engine based on the autoignition delay that is calculated.

Optionally, modifying the operation of the engine includes reducing flow of the premixed combustion fuel into the cylinder of the engine. Optionally, modifying the operation of the engine includes decreasing flow of the non-premixed combustion fuel into the cylinder of the engine without eliminating flow of the non-premixed combustion fuel into the cylinder. Optionally, modifying the operation of the engine includes injecting a coolant into the cylinder of the engine.

Optionally, modifying the operation of the engine includes derating the engine. Optionally, modifying the operation of the engine includes changing injection timing of one or more of the premixed combustion fuel or the non-premixed combustion fuel into the cylinder. Optionally, the method also includes calculating an upper limit on the amount of the premixed combustion fuel that is supplied to the multi-fuel engine based on the one or more operating conditions that are monitored and the autoignition delay that is calculated, and controlling flow of the non-premixed combustion fuel into the cylinder of the engine to prevent the amount of the non-premixed combustion fuel that is injected into the cylinder from exceeding the lower, non-zero limit. Optionally, controlling the flow of the premixed combustion fuel into the cylinder includes reducing the flow of the premixed combustion fuel into the cylinder. Optionally, controlling the flow of the premixed combustion fuel into the cylinder to be less than the upper limit prevents engine knock in the cylinder of the engine. Optionally, the flow of the non-premixed combustion fuel into the cylinder of the engine is controlled to prevent the amount of the non-premixed combustion fuel that is injected into the cylinder from exceeding the lower, non-zero limit without an operating speed of the engine changing.

Optionally, the autoignition delay represents a likelihood of engine knock of the multi-fuel engine. Optionally, the non-premixed combustion fuel is diesel fuel, kerosene, JP8, or the like and the premixed combustion fuel is one or more of gasoline, ethanol, methanol, syngas, natural gas, liquefied petroleum gas, or hydrogen gas. Optionally, the one or more operating conditions that are monitored include one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine.

In one embodiment, an engine control unit of a multi-fuel engine includes hardware circuitry that includes one or more processors configured or programmed to monitor one or more operating conditions of the multi-fuel engine that consumes a mixture of air, a non-premixed combustion fuel, and a premixed combustion fuel. The one or more processors determine a designated autoignition delay of the mixture of the air, the non-premixed combustion fuel, and the premixed combustion fuel. The designated autoignition delay represents a period of time following introduction of the non-premixed combustion fuel and the premixed combustion fuel into a cylinder of the multi-fuel engine before the premixed combustion fuel ignites. The one or more processors also calculate an upper limit on an amount of the premixed combustion fuel that is supplied to the multi-fuel engine based on the one or more operating conditions that are monitored and the designated autoignition delay that is determined. The one or more processors also control flow of the non-premixed combustion fuel into the cylinder of the engine to prevent the amount of the non-premixed combustion fuel that is injected into the cylinder from exceeding the lower, non-zero limit.

Optionally, the designated autoignition delay represents a likelihood of engine knock of the multi-fuel engine. Optionally, the non-premixed combustion fuel is diesel fuel, kerosene, JP8, or the like and the premixed combustion fuel is one or more of gasoline, ethanol, methanol, syngas, natural gas, liquefied petroleum gas, or hydrogen gas. Optionally, the one or more operating conditions that are monitored by the one or more processors include one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine.

Optionally, the one or more processors control the flow of the premixed combustion fuel into the cylinder by reducing the flow of the premixed combustion fuel into the cylinder. Optionally, the one or more processors control the flow of the premixed combustion fuel into the cylinder to be less than the upper limit to prevent engine knock in the cylinder of the engine. Optionally, the one or more processors control the flow of the non-premixed combustion fuel into the cylinder of the engine to prevent the amount of the non-premixed combustion fuel that is injected into the cylinder from exceeding the lower, non-zero limit without an operating speed of the engine changing.

In one embodiment, an engine control unit of a multi-fuel engine includes hardware circuitry that includes one or more processors configured or programmed to monitor one or more operating conditions of the multi-fuel engine that consumes a mixture of air, a non-premixed combustion fuel, and a premixed combustion fuel. The one or more processors determine an amount of the premixed combustion fuel that is supplied to the multi-fuel engine and to calculate an autoignition delay of the mixture of the air, the non-premixed combustion fuel, and the premixed combustion fuel. The autoignition delay represents a period of time following introduction of the non-premixed combustion fuel and the premixed combustion fuel into a cylinder of the multi-fuel engine before the premixed combustion fuel ignites during knocking of the multi-fuel engine. The one or more processors also modify operation of the engine based on the autoignition delay that is calculated.

Optionally, the one or more processors modify the operation of the engine by reducing flow of the premixed combustion fuel into the cylinder. Optionally, the one or more processors modify the operation of the engine by increasing flow of the non-premixed combustion fuel into the cylinder of the. Optionally, the one or more processors modify the operation of the engine by injecting a coolant into the cylinder of the engine.

Optionally, the one or more processors modify the operation of the engine by derating the engine. Optionally, the one or more processors modify the operation of the engine by changing injection timing of one or more of the premixed combustion fuel or the non-premixed combustion fuel into the cylinder. Optionally, the one or more processors also calculate an upper limit on the amount of the premixed combustion fuel that is supplied to the multi-fuel engine based on the one or more operating conditions that are monitored and the autoignition delay that is calculated. The one or more processors also can be configured or programmed to control flow of the non-premixed combustion fuel into the cylinder of the engine to prevent the amount of the non-premixed combustion fuel that is injected into the cylinder from exceeding the lower, non-zero limit.

Optionally, the one or more processors control the flow of the premixed combustion fuel into the cylinder by reducing the flow of the premixed combustion fuel into the cylinder. Optionally, the one or more processors control the flow of the premixed combustion fuel into the cylinder to be less than the upper limit prevents engine knock in the cylinder of the engine. Optionally, the one or more processors control the flow of the non-premixed combustion fuel into the cylinder of the engine to prevent the amount of the non-premixed combustion fuel that is injected into the cylinder from exceeding the lower, non-zero limit without an operating speed of the engine changing. Optionally, the autoignition delay represents a likelihood of engine knock of the multi-fuel engine. Optionally, the non-premixed combustion fuel is diesel fuel, kerosene, JP8, or the like and the premixed combustion fuel is one or more of gasoline, ethanol, methanol, syngas, natural gas, liquefied petroleum gas, or hydrogen gas.

Optionally, the one or more processors monitor one or more of a manifold airflow temperature of the engine, a manifold airflow pressure of the engine, a flow rate of the air into the cylinder of the engine, a flow rate of the non-premixed combustion fuel into the cylinder of the engine, an operating speed of the engine, or an injection timing of the cylinder of the engine as the one or more operating conditions.

In one embodiment, an engine control unit of a multi-fuel engine is provided. The engine consumes a mixture of a first combustion fuel and a second combustion fuel. The engine control unit includes hardware circuitry that includes one or more processors configured or programmed to calculate an autoignition delay of the mixture of the air and the second combustion fuel based on current operating conditions of the multi-fuel engine. The one or more processors also are configured or programmed to calculate an upper limit on an amount of the second combustion fuel that is supplied to the multi-fuel engine based on the autoignition delay that is calculated.

Optionally, the one or more processors also are configured or programmed to control flow of the second combustion fuel into the engine to control the amount of the second combustion fuel that is injected into the engine from exceeding the upper limit.

Optionally, the one or more processors are configured or programmed to change at least one of the operating conditions based on the designated autoignition delay.

Optionally, the first combustion fuel comprises diesel fuel, kerosene, JP8 jet fuel and the second combustion fuel comprises one or more of gasoline, ethanol, methanol, syngas, natural gas, liquefied petroleum gas, or hydrogen gas.

Optionally, the one or more operating conditions include one or more of a manifold airflow temperature of the engine, a manifold airflow pressure of the engine, a flow rate of the air into the engine, a flow rate of the non-premixed combustion fuel into the engine, an operating speed of the engine, or an injection timing of the engine.

Optionally, the one or more processors are configured or programmed to control the flow of the second combustion fuel into the engine by increasing the flow of the first combustion fuel into the engine without eliminating the flow of the second combustion fuel into the engine.

Optionally, the one or more processors are configured or programmed to calculate the upper limit to include a buffer having a value that is updated based on detection of a knock signal from a knock sensor.

In one embodiment, a method includes calculating an autoignition delay of a mixture of a first combustion fuel and a second combustion fuel that are supplied to a multi-fuel engine. The autoignition delay is calculated based on current operating conditions of the multi-fuel engine. The method also includes calculating an upper limit on an amount of the second combustion fuel that is supplied to the multi-fuel engine based on the autoignition delay that is calculated.

Optionally, the method also includes controlling flow of the second combustion fuel into the engine to control the amount of the second combustion fuel that is injected into the engine from exceeding the upper limit.

Optionally, the method also includes changing at least one of the operating conditions based on the autoignition delay.

Optionally, the first combustion fuel comprises diesel fuel, kerosene, JP8 jet fuel and the second combustion fuel comprises one or more of gasoline, ethanol, methanol, syngas, natural gas, liquefied petroleum gas, or hydrogen gas.

Optionally, the one or more operating conditions include one or more of a manifold airflow temperature of the engine, a manifold airflow pressure of the engine, a flow rate of the air into the engine, a flow rate of the non-premixed combustion fuel into the engine, an operating speed of the engine, or an injection timing of the engine.

Optionally, the method also includes controlling flow of the second combustion fuel into the engine by increasing the flow of the first combustion fuel into the engine without eliminating the flow of the second combustion fuel into the engine.

Optionally, the upper limit is calculated to include a buffer having a value that is updated based on detection of a knock signal from a knock sensor.

In one embodiment, a method includes monitoring one or more operating conditions of a multi-fuel engine that consumes a mixture of air, a non-premixed combustion fuel, and a premixed combustion fuel; determining an amount of the premixed combustion fuel that is supplied to the multi-fuel engine; calculating an autoignition delay of the mixture of the air and the premixed combustion fuel, the autoignition delay representing a period of time before the premixed combustion fuel ignites during knocking of the engine; and modifying operation of the engine based on the autoignition delay that is calculated.

Optionally, modifying the operation of the engine includes reducing flow of the non-premixed combustion fuel into at least one cylinder of the engine without eliminating the flow of the non-premixed combustion fuel into the cylinder.

Optionally, modifying the operation of the engine includes injecting a coolant into at least one cylinder of the engine.

Optionally, modifying the operation of the engine includes derating the engine.

Optionally, modifying the operation of the engine includes changing an injection timing of one or more of the premixed combustion fuel or of the non-premixed combustion fuel in at least one cylinder of the engine.

Optionally, modifying the operation of the engine includes changing a flow rate of the non-premixed combustion fuel into at least one cylinder of the engine.

Thus, the systems and methods described herein provide for embodiments for reducing auto-ignition of end gases following compression ignition of injected liquid fuel in a multi-fuel engine configured to operate with both liquid and gaseous fuel. End gases may include the fuel-air mixture that has been introduced into the cylinder but not yet consumed in the flame-front reaction of the compression-ignition of the liquid fuel. In one example, a system comprises a first fuel system to deliver liquid fuel to at least one cylinder of an engine, a second fuel system to deliver gaseous fuel to the at least one cylinder, and a controller. The controller is configured to control the supply of the gaseous fuel to the at least one cylinder, inject the liquid fuel to the at least one cylinder thereby to ignite the liquid fuel and the gaseous fuel in the at least one cylinder via compression-ignition of the liquid fuel, and adjust an amount of gaseous fuel (e.g., relative to an amount of liquid fuel) based on a measured parameter associated with auto-ignition of end gases subsequent to the compression-ignition of the liquid fuel. The amount of gaseous fuel to liquid fuel (substitution rate) is not initially based on the presence of auto-ignition, but on other parameters such as throttle notch position, engine temperature, etc. The substitution rate may decrease (less gaseous fuel and more liquid fuel) only under auto-ignition conditions when adjustments in liquid fuel injection timing does not reduce the auto-ignition as monitored via one or more sensors measuring cylinder vibrations.

The measured parameter may include engine vibrations detected by an accelerometer, for example. The injection of the liquid fuel may comprise a stratified injection of liquid fuel. In some examples, the liquid fuel is diesel fuel, and the first fuel system comprises a fuel tank for holding the diesel fuel, a common fuel rail, and at least one fuel injector. The diesel fuel in the fuel tank may be supplied to the common fuel rail by at least one fuel pump, the common fuel rail may be configured to supply the diesel fuel to each fuel injector of the at least one fuel injector, and each fuel injector of the at least one fuel injector may be coupled to a respective cylinder of the at least one cylinder of the engine. The gaseous fuel may be natural gas, and the second fuel system may comprise a fuel tank to hold the natural gas, and at least one gas admission valve, each gas admission valve of the at least one gas admission valve coupled to a respective cylinder of the at least one cylinder of the engine. However, in some examples, rather than including a plurality of gas admission valves, each coupled to a respective cylinder, the second fuel system may include a single gaseous fuel control valve to regulate an amount of gaseous fuel mixed with intake air upstream of the cylinders.

The controller may be configured to retard an injection timing of the injection of liquid fuel in response to the measured parameter. The controller may be configured to decrease the amount of gaseous fuel relative to the amount of liquid fuel in response to the measured parameter. In some examples, after decreasing the amount of gaseous fuel relative to the amount of liquid fuel and responsive to the measured parameter indicating that the auto-ignition of end gases has ceased, the controller may be configured to increase the amount of gaseous fuel relative to the amount of liquid fuel. Further, after decreasing the amount of gaseous fuel relative to the amount of liquid fuel and responsive to the measured parameter indicating that the auto-ignition of end gases has not ceased, the controller may be configured deactivate the supply of gaseous fuel to the at least one cylinder and increase the amount of liquid fuel to maintain engine power.

To decrease the amount of gaseous fuel relative to the amount of liquid fuel, one or more gas admission valves may be adjusted. For example, one or more gas admission valves degree and/or duration of opening may be reduced to reduce the amount of gaseous fuel. In single-point fumigation systems, to decrease the amount of gaseous fuel relative to the amount of liquid fuel, a gaseous fuel control valve may be adjusted to reduce the amount of gaseous fuel mixed with the intake air upstream of the cylinders (e.g., in the intake manifold or intake passage upstream of the intake manifold). In such systems, the amount of liquid fuel may be increased, maintained, or reduced in lower proportion or lower magnitude with respect to the reduction of the amount of gaseous fuel.

The at least one cylinder may comprise a first cylinder including a first gas admission valve and a first liquid fuel injector, and a second cylinder including a second gas admission valve and a second liquid fuel injector. The controller may be configured to identify, based on the measured parameter, if the auto-ignition is occurring in the first cylinder, the second cylinder, or both the first and second cylinders.

If the auto-ignition is detected in both the first cylinder and the second cylinder, the controller is configured to reduce the auto-ignition by one or more of: retarding injection timing of liquid fuel injection from the first liquid fuel injector and the second liquid fuel injector; or increasing an amount of liquid fuel injected by the first fuel injector relative to an amount of gaseous fuel supplied by the first gas admission valve and increasing an amount of liquid fuel injected by the second fuel injector relative to an amount of gaseous fuel supplied by the second gas admission valve.

If the auto-ignition is detected in the first cylinder and not in the second cylinder, the controller is configured to reduce the auto-ignition in the first cylinder by one or more of: retarding injection timing of liquid fuel injection from the first liquid fuel injector while maintaining injection timing of liquid fuel injection from the second liquid fuel injector; or increasing an amount of liquid fuel injected by the first fuel injector relative to an amount of gaseous fuel supplied by the first gas admission valve while maintaining an amount of liquid fuel injected by the second fuel injector relative to an amount of gaseous fuel supplied by the second gas admission valve.

The controller may be configured to identify a level of auto-ignition in each of the first cylinder and second cylinder based on the measured parameter, and if the level of auto-ignition in the first cylinder is above a threshold level, the controller is configured to deactivate the first gas admission valve (e.g., maintain the gas admission valve in a fully closed position) and increase the amount of liquid fuel injected by the first fuel injector to maintain engine power.

In another example, a system comprises a first fuel system operable to deliver liquid fuel to a plurality of cylinders in an engine, the first fuel system comprising a first fuel tank, a common fuel rail, and a plurality of fuel injectors, each fuel injector configured to inject liquid fuel to a respective cylinder of the plurality of cylinders; a second fuel system operable to deliver gaseous fuel to the plurality of cylinders, the second fuel system comprising a second fuel tank and a plurality of gas admission valves, each gas admission valve configured to supply gaseous fuel to a respective cylinder of the plurality of cylinders; and a control system. The control system is configured to, for each cylinder, combust a mixture of the gaseous fuel and air by injecting liquid fuel to each cylinder of the plurality of cylinders, the gaseous fuel and liquid fuel provided at a first ratio; if auto-ignition of end gases after primary ignition resulting from the injection of the liquid fuel is detected in at least one cylinder, retard an injection timing of injection of the liquid fuel to the at least one cylinder; and if the auto-ignition is still detected after the retarding of the injection timing, adjust at least one of an amount of the gaseous fuel or an amount of the liquid fuel provided to the at least one cylinder to a second ratio, different than the first ratio.

The injection of liquid fuel may comprise stratified injection, and the combustion of the mixture of gaseous fuel and air by the injection of the liquid fuel may comprise compression ignition of the liquid fuel with the mixture of the gaseous fuel and air so as to combust the mixture of the gaseous fuel and air via a propagating flame front resulting from the compression ignition of the liquid fuel. The control system may be configured to, when adjusting said at least one of the amount of the gaseous fuel or the amount of the liquid fuel to the second ratio, increase the amount of liquid fuel relative to the amount of gaseous fuel.

In a further example, a method comprises supplying gaseous fuel to at least one cylinder of an engine; igniting the gaseous fuel and intake air by injecting liquid fuel to the at least one cylinder and compression igniting the injected liquid fuel, the gaseous fuel and liquid fuel provided to the at least one cylinder at a substitution ratio; and in response to a measured parameter associated with auto-ignition of end gases after the ignition resulting from the injection of the liquid fuel to the at least one cylinder, adjusting the substitution ratio.

The substitution ratio comprises a ratio of the gaseous fuel to the liquid fuel provided to the at least one cylinder, and adjusting the substitution ratio may comprise decreasing the substitution ratio.

The method may further comprise monitoring cylinder output resulting from combustion of the gaseous fuel at the substitution ratio; and if the cylinder output differs from an expected output by more than a threshold amount, indicating degradation of a gas admission valve configured to supply the gaseous fuel to the at least one cylinder. The method may further comprise, if the cylinder output is greater than the expected output, decreasing one or more of an amount of the gaseous fuel or an amount of the liquid fuel supplied to the at least one cylinder, and if the cylinder output is still greater than the expected output subsequent to said decreasing of the one or more of the amount of the gaseous fuel or the amount of the liquid fuel, indicating the gas admission valve is open by more than a desired amount and deactivating the supply of gaseous fuel. The method may further comprise, if the cylinder output is less than the expected output, increasing an amount of the liquid fuel supplied to the at least one cylinder until the cylinder output equals the expected output. The cylinder output may comprise one or more of engine power or exhaust gas temperature.

In an embodiment, a system comprises a first fuel system to deliver liquid fuel to at least one cylinder of an engine, a second fuel system to deliver gaseous fuel to the at least one cylinder, and a controller. The controller is configured to control the second fuel system for supplying the gaseous fuel to the at least one cylinder, and to control the first fuel system for injection of the liquid fuel to the at least one cylinder, for ignition of the liquid fuel by compression ignition and subsequent combustion of the gaseous fuel. The controller is further configured to control at least one of the second fuel system or the first fuel system to adjust an amount of the gaseous fuel (supplied to the at least one cylinder) relative to an amount of the liquid fuel (injected into the at least one cylinder) based on a measured parameter associated with auto-ignition of end gases subsequent to the compression-ignition of the liquid fuel.

In another embodiment of the system, the controller is configured to control retarding of an injection timing of the injection of the liquid fuel in response to the measured parameter. The measured parameter comprises vibration of the engine.

In another embodiment of the system, the controller is configured to control the at least one of the second fuel system or the first fuel system to decrease the amount of the gaseous fuel relative to the amount of the liquid fuel in response to the measured parameter. (For example, the second fuel system may be controlled to decrease the amount of gaseous fuel while the first fuel system is controlled for the amount of liquid fuel to remain static, increase, or even decrease but not to the extent that would prevent the ratio of gaseous fuel to liquid fuel from decreasing, or the first fuel system may be controlled to increase the amount of liquid fuel while the second fuel system is controlled for the amount of gaseous fuel to remain static, decrease, or even increase but not to the extent that would prevent the ratio of gaseous fuel to liquid fuel from decreasing.)

In another embodiment of the system, the controller is configured to, after controlling decreasing the amount of gaseous fuel relative to the amount of liquid fuel and responsive to the measured parameter indicating that the auto-ignition of end gases has ceased, control at least one of the second fuel system or the first fuel system to increase the amount of gaseous fuel relative to the amount of liquid fuel. (For example, the second fuel system may be controlled to increase the amount of gaseous fuel while the first fuel system is controlled for the amount of liquid fuel to remain static, decrease, or even increase but not to the extent that would prevent the ratio of gaseous fuel to liquid fuel from increasing, or the first fuel system may be controlled to decrease the amount of liquid fuel while the second fuel system is controlled for the amount of gaseous fuel to remain static, increase, or even decrease but not to the extent that would prevent the ratio of gaseous fuel to liquid fuel from increasing.)

In another embodiment of the system, the controller is configured to, after decreasing the amount of gaseous fuel relative to the amount of liquid fuel and responsive to the measured parameter indicating that the auto-ignition of end gases has not ceased, control the second fuel system to deactivate the supply of gaseous fuel to the at least one cylinder and control the first fuel system to increase the amount of liquid fuel to maintain engine power.

In another embodiment of the system, the injection of the liquid fuel comprises a stratified injection of the liquid fuel, e.g., the controller may be configured to control the first fuel system for the injection of the liquid fuel into the at least one cylinder to be a stratified injection.

In another embodiment of the system, the at least one cylinder comprises a first cylinder including a first gas admission valve and a first liquid fuel injector, and a second cylinder including a second gas admission valve and a second liquid fuel injector. The controller is configured to identify, based on the measured parameter, if the auto-ignition is occurring in the first cylinder, the second cylinder, or both the first and second cylinders. According to another aspect, if the auto-ignition is detected in both the first cylinder and the second cylinder, the controller is configured to reduce the auto-ignition by one or more of: controlling the first fuel system to retard injection timing of the liquid fuel injection from the first liquid fuel injector and the second liquid fuel injector; or controlling at least one of the first fuel system or the second fuel system to increase an amount of liquid fuel injected by the first fuel injector relative to an amount of gaseous fuel supplied by the first gas admission valve and increase an amount of liquid fuel injected by the second fuel injector relative to an amount of gaseous fuel supplied by the second gas admission valve. According to another aspect, additionally or alternatively, if the auto-ignition is detected in the first cylinder and not in the second cylinder, the controller is configured to reduce the auto-ignition in the first cylinder by one or more of: controlling the first fuel system to retard injection timing of liquid fuel injection from the first liquid fuel injector while maintaining injection timing of liquid fuel injection from the second liquid fuel injector; or control at least one of the first fuel system or the second fuel system to increase an amount of liquid fuel injected by the first fuel injector relative to an amount of gaseous fuel supplied by the first gas admission valve while maintaining an amount of liquid fuel injected by the second fuel injector relative to an amount of gaseous fuel supplied by the second gas admission valve. The controller may be further configured to identify a level of auto-ignition in each of the first cylinder and second cylinder based on the measured parameter, and if the level of auto-ignition in the first cylinder is above a threshold level, the controller is configured to control the second fuel system to deactivate the first gas admission valve and to control the first fuel system to increase the amount of liquid fuel injected by the first fuel injector to maintain engine power.

In another embodiment of the system, the liquid fuel is diesel fuel. The first fuel system comprises a fuel tank for holding the diesel fuel, a common fuel rail, at least one fuel injector, and at least one fuel pump. The diesel fuel in the fuel tank is supplied to the common fuel rail by the at least one fuel pump. The common fuel rail is configured to supply the diesel fuel to each fuel injector of the at least one fuel injector. Each fuel injector of the at least one fuel injector is coupled to a respective cylinder of the at least one cylinder of the engine.

In another embodiment of the system, the gaseous fuel is natural gas. The second fuel system comprises a fuel tank and at least one gas admission valve. Each gas admission valve of the at least one gas admission valve is coupled to a respective cylinder of the at least one cylinder of the engine.

In another embodiment of the system, the liquid fuel is diesel fuel and the gaseous fuel is natural gas. The first fuel system comprises a fuel tank for holding the diesel fuel, a common fuel rail, at least one fuel injector, and at least one fuel pump. The diesel fuel in the fuel tank is supplied to the common fuel rail by the at least one fuel pump. The common fuel rail is configured to supply the diesel fuel to each fuel injector of the at least one fuel injector. Each fuel injector of the at least one fuel injector is coupled to a respective cylinder of the at least one cylinder of the engine. The second fuel system comprises a fuel tank (for storage of the natural gas) and at least one gas admission valve. Each gas admission valve of the at least one gas admission valve is coupled to a respective cylinder of the at least one cylinder of the engine.

In a further embodiment, a system comprises a first fuel system operable to deliver liquid fuel to a plurality of cylinders in an engine, the first fuel system comprising a first fuel tank, a common fuel rail, and a plurality of fuel injectors, each fuel injector configured to inject liquid fuel to a respective cylinder of the plurality of cylinders; a second fuel system operable to deliver gaseous fuel to the plurality of cylinders, the second fuel system comprising a second fuel tank and gaseous fuel control valve configured to supply gaseous fuel to the plurality of cylinders; and a control system. The control system is configured to, for each cylinder, combust a mixture of the gaseous fuel and air by injecting liquid fuel to each cylinder of the plurality of cylinders, the gaseous fuel and liquid fuel provided at a first ratio; if auto-ignition of end gases after primary ignition resulting from the injection of the liquid fuel is detected in at least one cylinder, retard an injection timing of injection of the liquid fuel to the at least one cylinder; and if the auto-ignition is still detected after the retarding of the injection timing, adjust at least one of an amount of the gaseous fuel or an amount of the liquid fuel provided to the at least one cylinder to a second ratio, different than the first ratio. The amount of gaseous fuel may be adjusted by controlling the position and/or opening duration of the gaseous fuel control valve.

As explained above, the terms "high pressure" and "low pressure" are relative, meaning that "high" pressure is a pressure higher than a "low" pressure. Conversely, a "low" pressure is a pressure lower than a "high" pressure.

As used herein, an element or step recited in the singular and preceded with the word "a" or "an" should be understood as not excluding plural of said elements or steps, unless such exclusion is explicitly stated. Furthermore, references to "one embodiment" or "one example" of the present invention are not intended to be interpreted as excluding the existence of additional embodiments or examples that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a fuel system configured to supply one or more of a first fuel, a second fuel, and a pre-mixture of the first fuel and the second fuel to at least one cylinder of an engine; and
a controller including instructions stored in non-transitory memory thereof that cause the controller to:
determine an auto-ignition level is less than or equal to a threshold level,
adjust a timing of an injection of the first fuel to retard the timing while maintaining a substitution rate in response to determining the auto-ignition level is less than or equal to the threshold level, and
incrementally reduce the substitution rate in response to auto-ignition occurring following adjusting the timing of the injection of the first fuel.

2. The system of claim 1, wherein incrementally reducing the substitution rate comprises reducing the substitution rate by 5% or less, the substitution rate based on a substitution of the second fuel for the first fuel.

3. The system of claim 1, wherein the injection is a first injection during an intake stroke of the engine.

4. The system of claim 2, wherein the instructions further cause the controller to carry out a second injection, and wherein the first injection is deactivated during the second injection and an amount of the first fuel injected is increased via the second injection as compared to the first injection.

5. The system of claim 4, wherein the instructions further cause the controller to inject the pre-mixture to the engine, wherein the pre-mixture forms part of a substitution ratio, and wherein the substitution ratio is an amount of the pre-mixture relative to total combustion fuel supplied to the engine.

6. The system of claim 1, wherein the first fuel and the second fuel are different from one another, the first fuel is gasoline, diesel, hydrogenation-derived renewable diesel (HDRD), alcohol, ammonia, biodiesels, hydrogen, natural gas, kerosene, syn-gas, kerosene, dimethyl ether, or J8 jet fuel, and the second fuel is gasoline, diesel, hydrogenation-derived renewable diesel (HDRD), alcohol, ammonia, biodiesels, hydrogen, natural gas, kerosene, syn-gas, kerosene, dimethyl ether, or J8 jet fuel.

7. The system of claim 1, wherein the first fuel is directly injected to the engine, and wherein the second fuel and the pre-mixture are provided to the engine via a valve arranged in an intake of the engine.

8. A method, comprising:
injecting a first fuel to a combustion chamber via a direct injector positioned to inject directly into the combustion chamber;
flowing a different, second fuel to the combustion chamber via a valve positioned to inject toward an intake port of the combustion chamber;
determining a first auto-ignition exceeds a threshold level;
in response determining the first auto-ignition exceeds the threshold level:
adjusting a substitution rate of the first fuel and the second fuel; and
retarding an injection timing of the injection of the first fuel;
determining a second auto-ignition is equal to or less than the threshold level; and
in response to determining the second auto-ignition is equal to or less than the threshold level:
retarding a first fuel injection timing while maintaining the substitution rate; and
incrementally reducing the substitution rate in response to auto-ignition occurring following retarding the first fuel injection timing.

9. The method of claim 8, further comprising flowing the second fuel as a pre-mixture with the first fuel, wherein the first fuel and the second fuel are different from one another, the first fuel is gasoline, diesel, hydrogenation-derived renewable diesel (HDRD), alcohol, ammonia, biodiesels, hydrogen, natural gas, kerosene, syn-gas, kerosene, or J8 jet fuel, and the second fuel is gasoline, diesel, hydrogenation-derived renewable diesel (HDRD), alcohol, ammonia, biodiesels, hydrogen, natural gas, kerosene, syn-gas, kerosene, or J8 let fuel.

10. The method of claim 8, wherein injecting the first fuel comprises a first injection during an intake stroke and a second injection during a compression stroke, and wherein retarding the injection timing comprises retarding the injection timing of one of the first injection or the second injection.

11. The method of claim 10, further comprising decreasing a volume of the first injection and increasing a volume of the second injection.

12. The method of claim 8, wherein adjusting the substitution rate comprises decreasing the substitution rate in response to the auto-ignition being greater than the threshold level, wherein decreasing the substitution rate includes decreasing an amount of the second fuel relative to an amount of the first fuel.

13. The method of claim 8, wherein adjusting the substitution rate includes decreasing an amount of the second fuel, further comprising flowing a pre-mixture of the first fuel and the second fuel through the valve in response to the auto-ignition being greater than the threshold level.

14. The method of claim 8, wherein the combustion chamber is arranged in an engine of a vehicle, wherein the first fuel is a liquid fuel, the liquid fuel being diesel, biodiesel, ethanol, methanol, gasoline, hydrogenation-derived renewable diesel, urea, or dimethyl ether, and wherein the second fuel is a gaseous fuel, the gaseous fuel being natural gas, ammonia, syngas, hydrogen, ethanol, methanol, or dimethyl ether.

15. The method of claim 8, further comprising injecting a premixed combustion fuel to the combustion chamber, wherein the premixed combustion fuel forms part of a substitution ratio, wherein the substitution ratio is an amount of the premixed combustion fuel relative to a total combustion fuel supplied to the combustion chamber, wherein the premixed combustion fuel is a pre-mixture comprising the first fuel in a liquid or a gaseous state and the second fuel in a liquid or gaseous state.

16. A system, comprising:
an engine of a vehicle comprising a plurality of cylinders;
a first fuel system fluidly coupled to direct injectors of the plurality of cylinders and configured to supply a first fuel by injecting the first fuel;
a second fuel system fluidly coupled to intake port injectors and configured to supply a second fuel different than the first fuel;
a third fuel system fluidly coupled to one of the direct injectors or the intake port injectors and configured to supply a pre-mixture of the first and second fuels; and
a controller with instructions stored on non-transitory memory that cause the controller to:
in response to a comparison of an auto-ignition to a threshold level determining the auto-ignition being greater than the threshold level:
adjusting a substitution rate of the first fuel and the second fuel; and
retarding an injection timing of injection of the first fuel; and
in response to the comparison of the auto-ignition to the threshold level determining the auto-ignition to be equal to or less than the threshold level:
retarding a first fuel injection timing while maintaining the substitution rate in response to determining the auto-ignition level is less than or equal to the threshold level.

17. The system of claim 16, wherein the first fuel is one of diesel, hydrogenation-derived renewable diesel, or biodiesel, and wherein the second fuel is ammonia or hydrogen.

18. The system of claim 16, wherein adjusting the substitution rate comprises decreasing an amount of the second fuel and increasing an amount of the first fuel in response to the auto-ignition being greater than the threshold level.

19. The system of claim 16, wherein the instructions further cause the controller to inject the pre-mixture to the plurality of cylinders, wherein the pre-mixture forms part of a substitution ratio, wherein the substitution ratio is an amount of the pre-mixture relative to a total combustion fuel supplied to the plurality of cylinders; and
increase the substitution ratio while ensuring non-pre-mixed combustion fuel is not eliminated.

* * * * *